(12) United States Patent
Ollerenshaw et al.

(10) Patent No.: US 10,370,907 B2
(45) Date of Patent: Aug. 6, 2019

(54) DISCONNECT AND OTHER DEVICES FOR DOWNHOLE ASSEMBLY

(71) Applicant: INTELLIGENT DRILLING TOOLS LIMITED, Ecclesfield Sheffield, South Yorkshire (GB)

(72) Inventors: Andrew Ollerenshaw, Loxley (GB); James Hardy, Stannington (GB)

(73) Assignee: INTELLIGENT DRILLING TOOLS LIMITED, South Yorkshire (GB)

( * ) Notice: Subject to any disclaimer, the term of this patent is extended or adjusted under 35 U.S.C. 154(b) by 140 days.

(21) Appl. No.: 15/118,745

(22) PCT Filed: Feb. 13, 2015

(86) PCT No.: PCT/GB2015/050423
§ 371 (c)(1),
(2) Date: Aug. 12, 2016

(87) PCT Pub. No.: WO2015/121676
PCT Pub. Date: Aug. 20, 2015

(65) Prior Publication Data
US 2017/0044844 A1 Feb. 16, 2017

(30) Foreign Application Priority Data
Feb. 14, 2014 (GB) .................................. 1402660.3

(51) Int. Cl.
*E21B 17/06* (2006.01)
*E21B 21/10* (2006.01)
(Continued)

(52) U.S. Cl.
CPC ............ *E21B 17/06* (2013.01); *E21B 21/103* (2013.01); *E21B 47/0006* (2013.01); *G01P 15/00* (2013.01); *E21B 2034/007* (2013.01)

(58) Field of Classification Search
CPC ........................................................ E21B 17/06
(Continued)

(56) References Cited

FOREIGN PATENT DOCUMENTS

WO   2010/061231 A1   6/2010
WO   2013/140142 A2   9/2013

OTHER PUBLICATIONS

International Search Report of PCT/GB2015/050423 dated Jul. 2, 2015.

*Primary Examiner* — Taras P Bemko
(74) *Attorney, Agent, or Firm* — Meunier Carlin & Curfman LLC

(57) ABSTRACT

A downhole tool for incorporation in a drill pipe for selective operation of the tool from surface level when the tool is in a wellbore. The tool comprises a controller electrically powered by a power source separate from surface level, a first sensor of the controller to detect a dynamic variable of the tool in the wellbore and produce an output signal dependent thereon; a second sensor of the controller to detect a mechanical signal transmitted from an operator at surface level; a motor driven by the power source under the control of the controller when said mechanical signal is received; and an actuator driven by the motor to actuate the tool; wherein the controller switches between at least two states in response to changes in said dynamic variable, only in said second state the controller being receptive to said mechanical signal from the operator to drive the motor. The tool may be a disconnect device and/or a circ sub. A disconnect device has axially displaceable die retention sleeve preventing radial movement of dies that lock between the dies and a mandrel. When the retention sleeve is moved so that the dies can move, the disconnect is actuated. A circsub has a body having a throughbore receiving a piston movable between open and closed positions to control ports in the body selectively connecting the throughbore with the (Continued)

wellbore, said motor driving said actuator to enable or disable movement of the piston to said open position.

19 Claims, 13 Drawing Sheets

(51) Int. Cl.
*E21B 47/00* (2012.01)
*G01P 15/00* (2006.01)
*E21B 34/00* (2006.01)
(58) Field of Classification Search
USPC .......................................................... 166/66
See application file for complete search history.

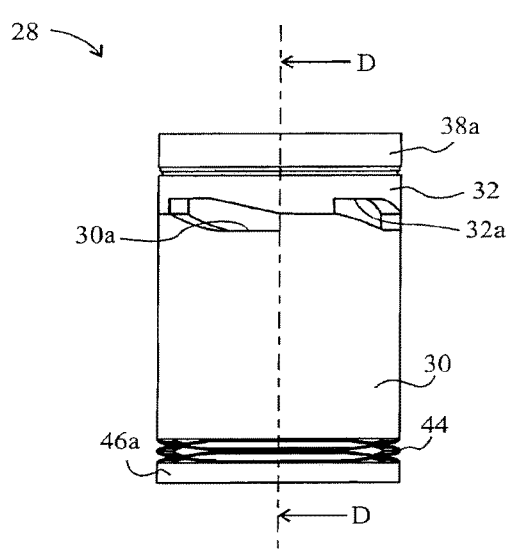
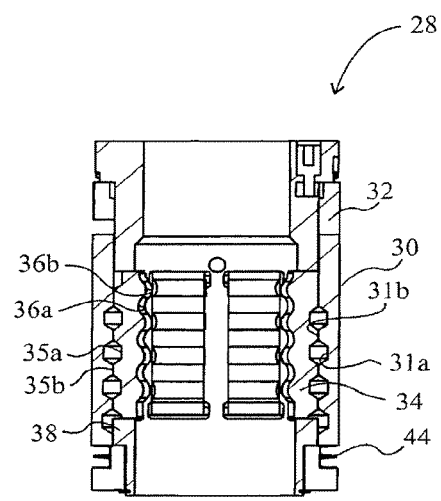
Fig. 5A        Fig. 5B
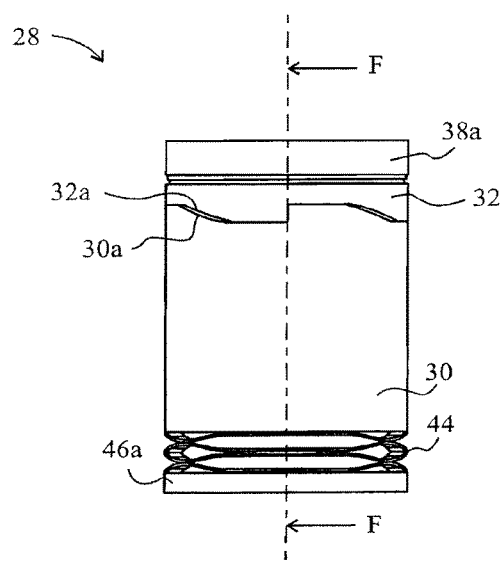
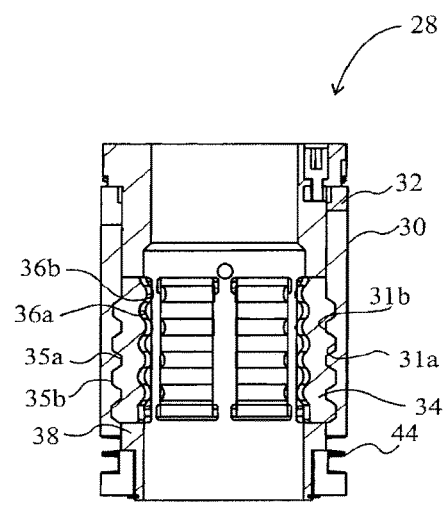
Fig. 6A        Fig. 6B

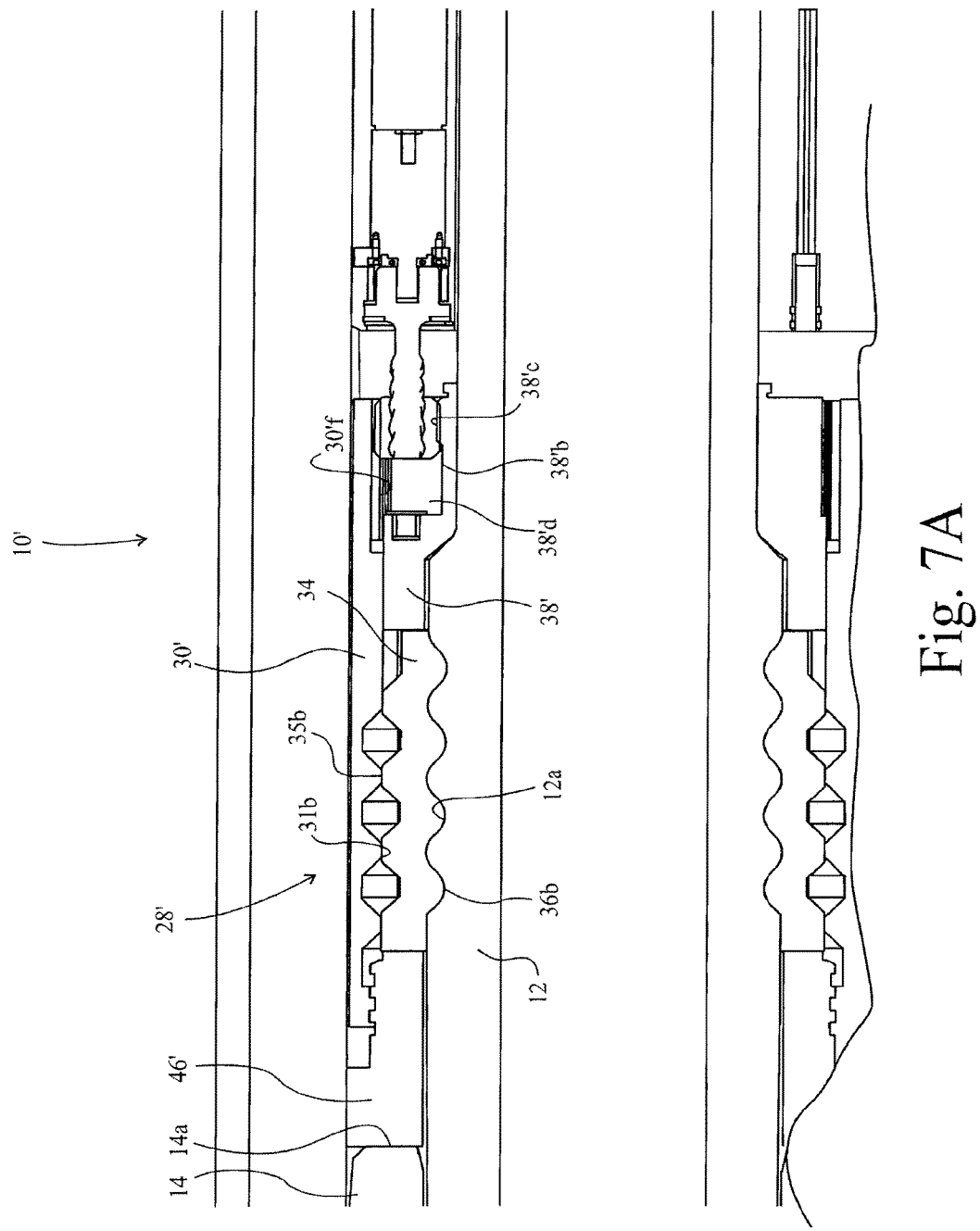

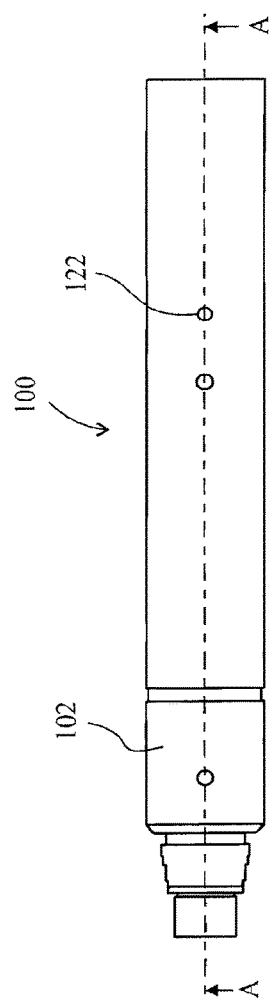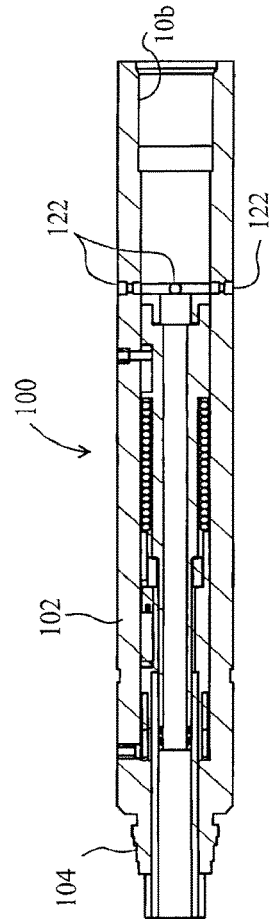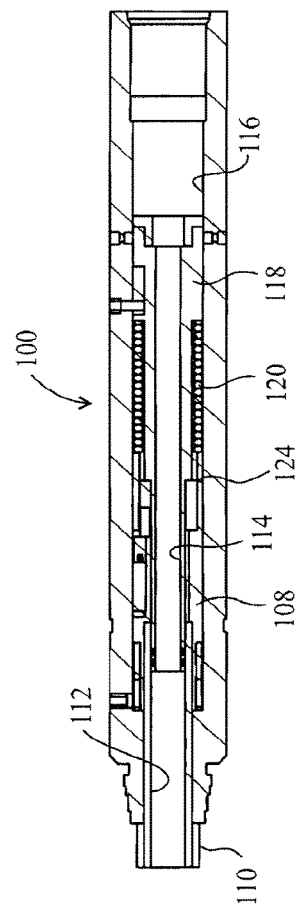

DISCONNECT AND OTHER DEVICES FOR DOWNHOLE ASSEMBLY

CROSS-REFERENCE TO RELATED APPLICATIONS

This application is a national stage application filed under 35 U.S.C. § 371 of PCT/GB2015/050423 filed Feb. 13, 2015, which claims the benefit of and priority to U.K. Patent Application No. 1402660.3 filed on Feb. 14, 2014, the disclosures of which are expressly incorporated herein by reference in their entirety.

This invention relates to disconnect and other devices for a downhole assembly or tool, and more specifically to a disconnect device that allows a controlled disconnect from a drilling bottom hole assembly. It also relates to such tools as circulating subs and other devices requiring a controlled movement to actuate them.

BACKGROUND

In the oil and gas industries, disconnect devices are typically used to separate a bottom hole assembly (BHA) from a drill string if, for example, the BHA becomes stuck. Once the drill string has been disconnected from the BHA, the operators can then attempt to recover the stuck BHA with a "fishing" tool. However, in situations where recovery of the BHA is impractical or impossible, the stuck BHA will be abandoned and drilling will recommence along a different route with a new BHA attached to the drill string.

Typical methods for disconnecting a drill string from a stuck BHA involve dropping a dart, ball or mud slug of high density fluid from the surface to interact with a shear pin or other locking device and actuate the separation. For example, WO-A-03/029605 (Weatherford/Lamb, Inc.) describes a disconnect device having two portions connected by a lock nut. The two portions separate when a predetermined fluid force is applied to a piston in the disconnect device causing a tensile sleeve to fail. In one particular embodiment, the tensile sleeve's failure permits an annular piston to dislodge a wedge sleeve from the lock nut, thereby permitting separation. Such arrangements require the circulation of drilling mud to transport the interacting article (dart, ball or mud slug). However, this is often impossible when the BHA becomes stuck. Another disconnect device that relies on the circulation of fluid is described in GB-B-2351101. The GB-B-2351101 device comprises a radially expandable locking ring that is configured to expand and thereby disconnect the device.

Alternatively, drill strings can be separated without using specialist tools by performing a precise series of "back off" movements and rotations such as turning the drill string leftward and overpulling to affect a release. This technique is often complicated and difficult and is consequently unreliable.

A third option is to separate the drill string above the point at which it is stuck by explosive means. US-A-2004/0200343 (Titan Specialties, Ltd.) describes a pipe severing tool that is positioned into a well bore before exploding to actuate separation. The tool comprises explosive pellets and electrically initiated exploding wire detonators (EBW) that are positioned at opposite ends of a tubular housing for simultaneous detonation by a capacitive firing device.

This technique is often used as a last resort and usually requires the skills of a specialist team which may take several days to arrive at the rig and sever the drill string. Due to the high operating costs of drill rigs, this significant time period of non-operation can lead to substantial financial losses which are highly undesirable. Additionally, the damaged end of the drill string must be replaced before a new BHA can be connected and drilling can recommence. Furthermore, most explosive disconnection techniques are dependent upon gravity for locating the explosives close to the point at which the tool is stuck. It follows that explosive disconnection is generally not an option for the disconnection of a BHA in a horizontal section of the well bore.

There is therefore a need to provide a disconnect device that allows for a controlled disconnect from the BHA with no physical input from the surface other than mechanical signals. The present invention satisfies this need and allows for the drill string to be retracted undamaged so that drilling can recommence as quickly and as easy as possible following the disconnection. It is a further object of the present invention to provide a secure disconnect device that will only actuate when the tool is stuck and the operator wishes to do so.

It is a further object to provide a tool that is actuated by controlled movements of the tool without other signalling from the surface so that tools such as circulating subs can be reliably activated when required.

WO-A-2010/061231 discloses a selectively operable downhole tool for incorporation in a drill pipe for selective operation of the downhole tool from surface level when the tool is in a wellbore, said selectively operable tool comprising:

a controller electrically powered by a power source separate from surface level;

a first sensor of the controller to detect a dynamic variable of the tool in the wellbore and produce an output signal dependent thereon;

a second sensor of the controller to detect a mechanical signal transmitted from an operator at surface level;

a first motor driven by the power source under the control of the controller when said mechanical signal is received; and a first actuator driven by the first motor to actuate the tool; wherein the controller switches between at least two states in response to changes in said dynamic variable, only in said second state the controller being receptive to said mechanical signal from the operator to drive the first motor.

Of course, the dynamic variable is frequently controlled to a greater or lesser extent by the operator. Variables such as vibration, temperature, hydrostatic pressure, are consequences of the situation but are not specifically determined by the operator and thus are essentially independent. However, other variables are more clearly under the control of the operator such as rotational accelerations or compressive forces or pump pressures, for instance. Mechanical signals transmitted by the operator from the surface typically take the form of changes in pump pressure, rotation of the drill string or load imposed on the drill string. Therefore, said first and second sensors may conceivably be detecting the same variable, except that, in the case of the first sensor, the detection is in response to some operational condition that serves to switch the controller between said states and in the case of the second sensor, the detection is in response to a specific operator signal that serves to cause the controller to actuate the tool. Even then, in some instances, the operational condition that causes switching between states of the controller might be deliberately induced to cause the controller to switch states.

WO-A-2010/061231 also discloses a disconnect tool for incorporation in a drill string between a downhole assembly and a drill pipe to selectively disconnect the downhole assembly from the drilling pipe when the downhole assembly is stuck in a wellbore, said disconnect tool comprises:

first and second parts that are releasably connected to one another by a disengagement apparatus, one of said first and second parts being adapted for connection to said drilling pipe and the other of said first and second parts being adapted for connection to said downhole tool, wherein said disengagement apparatus comprises an actuator and first and second coupling elements, the first coupling element comprising:

a die retention sleeve, axially movable in the first part from an operational position towards a disconnect position of the disengagement apparatus;

a clutch housing, disposed within said die retention sleeve, said clutch housing being axially and rotationally fixed in the first part;

windows in said clutch housing circumferentially spaced around the clutch housing; and radially displaceable capture dies housed in said windows, and the second coupling element comprising:

an interface of said second part adapted to be engaged by said capture dies, wherein, the actuator moves the retention sleeve between its operational and disconnect positions, so that when the first and second parts are engaged with one another and the retention sleeve is in its operational position, the capture dies bear against both the die retention sleeve and said interface of the second part to lock said first and second coupling elements and parts together, and when the retention sleeve is moved to its disconnect position, the capture dies can move radially to disengage from said interface so that said coupling is unlocked and said parts can separate.

BRIEF SUMMARY OF THE DISCLOSURE

In accordance with a first aspect of the present invention there is provided downhole tool for incorporation in a drill pipe for selective operation of the tool from surface level when the tool is in a wellbore, said selectively operable tool comprising:

a controller electrically powered by a power source separate from surface level;

a first sensor of the controller to detect a dynamic variable of the tool in the wellbore and produce an output signal dependent thereon;

a second sensor of the controller to detect a mechanical signal transmitted from an operator at surface level;

a first motor driven by the power source under the control of the controller when said mechanical signal is received; and a first actuator driven by the first motor to actuate the tool; wherein the controller switches between at least two states (also referred to as modes) in response to changes in said dynamic variable, only in said second state the controller being receptive to said mechanical signal from the operator to drive the first motor, characterised in that the downhole tool further comprises a second motor and a second actuator driven by the second motor, said second actuator comprising a mechanical brake having an engaged position and a disengaged position, said mechanical brake being configured to prevent actuation of the tool when in said engaged position, wherein, once the controller receives the mechanical signal from the operator to drive the first motor the controller is configured to sequentially:

drive the second motor to move said mechanical brake from the engaged position to the disengaged position; and drive the first motor to actuate the tool.

In one embodiment of the present invention, the downhole tool is a disconnect device. The dynamic variable may be rotational acceleration which, when it ceases because the bottom hole assembly (BHA) becomes stuck, serves to switch the tool between an active mode and a listening mode, in the latter of which it awaits signals from the surface that instruct it to disconnect. The surface signals may conveniently be compressive forces on the drill string detected as compressions by proximity sensors or strain gauges.

In a quite different embodiment, the downhole tool is a circulating subassembly (circsub) disposed above a BHA, or forming part of it. A circulating subassembly is generally employed in two situations. A first is when increased debris clearance is desired. For example, the drill may be progressing very rapidly and be generating more debris than usual that needs to be recovered. Alternatively, it may be desired to clean the hole when drilling has finished. A second application is when drilling mud is being lost and it is necessary to circulate lost circulation material (LCM) to block cracks and crevices in the well bore and through which the mud is leaking into the formation. To ensure that the LCM does not simply block the drill equipment, a large exit from the drill conduit is desirable. In this case, the dynamic variable that switches the tool from normal, active mode to a listening mode may be fluid pressure. However, it may also comprise something as straightforward as some specific combination of rotational acceleration and pressure for a set period of time that is then terminated and, within another period of time, a new or further combination of the same parameters causes the circsub to activate.

A mechanical brake may prevent damage to the first motor that may otherwise be caused by vibrations being transmitted from the tool to the first motor via the first actuator. Such vibrations could cause the first motor to be driven via the first actuator.

Both a disconnect and circsub according to the invention may be employed in the same drill string.

In accordance with a second aspect of the present invention there is provided a disconnect tool as described above as disclosed in WO-A-2010/061231, characterised in that said pinion is fixed to an output shaft so that relative axial movement between the pinion and the output shaft is prevented, the disconnect tool further comprising a second motor and a second actuator controlled by said second motor, said second actuator comprising a mechanical brake having an engaged position and a disengaged position, said mechanical brake being configured to prevent screwing of the sleeve when said mechanical brake is in said engaged position.

In one embodiment, said actuator is an axially fixed cam collar having a first cam surface and the sleeve having a second cam surface, a spring axially biasing the sleeve into mutual engagement of the cam surfaces, one of said cam collar and sleeve being rotatable by a motor between release and lock positions of the collar, which respectively permit or block the sleeve from moving to its disconnect position. Preferably, the sleeve is rotationally fixed in the first part. In a preferable embodiment, the spring urges the die retention sleeve to move to its disconnect position when the collar is rotated to its release position.

Alternatively, said actuator comprises the sleeve being screw threaded on said first part and having a circumferential rack driven by a pinion of a motor, whereby screwing of the sleeve on the first part moves it axially between said operational and disconnect positions. Said pinion may be threaded on a coarsely threaded output shaft of the motor and is translatable along said shaft between driving and secured positions, in the driving position it being engaged only with said rack whilst in the secured position it being engaged with a block of the sleeve preventing further rotation of the pinion whilst permitting axial movement thereof.

In an alternative embodiment the pinion may be fixed to an output shaft so that relative axial movement between the pinion and the output shaft is prevented, the disconnect tool further comprising a second motor and a second actuator controlled by said second motor, said second actuator comprising a mechanical brake having an engaged position and a disengaged position, said mechanical brake being configured to prevent screwing of the sleeve when in said engaged position.

Said mechanical brake may preferably comprise a plurality of teeth configured to engage said circumferential rack, said second motor being configured to move said plurality of teeth axially between said engaged position in which said teeth engage said circumferential rack and said disengaged position in which said teeth do not engage said circumferential rack. The axial movement of the teeth between said engaged and disengaged positions may be effected by a lead screw controlled by said second motor.

In a further embodiment said sleeve may comprise a first, retaining sleeve and a second, intermediate sleeve, said first sleeve being screw threaded on said first part and said second sleeve having said circumferential rack, wherein said first sleeve is provided with internal or external splines configured to engage corresponding external or internal splines on said second sleeve, whereby rotation of one of said first and second sleeves is transmitted to the other sleeve, and some relative axial motion between said first and second sleeves is permitted. In this embodiment the disconnect device may advantageously further comprise a motion sensor, preferably a hall effect magnetic sensor, configured to detect relative axial motion between said first and second sleeves. Such a motion sensor may conveniently receive signals from the operator, for example the signal to move the retention sleeve to the disconnect position.

The above described embodiment of the invention provides reliable means for retaining the first and second parts of the disconnect tool together under normal operating conditions and allows for a mechanical separation upon actuation of the actuator. The above arrangement provides disconnect means that does not explosively sever components and therefore does not damage the drill string. Drilling can recommence quickly, therefore, as soon as a new BHA is attached.

Preferably, the capture dies comprise a series of grooves and ridges and said interface and said die retention sleeve have surfaces that are each complimentary to said series of grooves and ridges. The complimentary ridges of the capture dies and die retention sleeve are preferably part-cylindrical lands adapted to seat on each other in said operational position of the disengagement apparatus. Preferably, the complimentary grooves and ridges of the capture dies and die retention sleeve have part-conical side surfaces whereby the ridges on one can inter-digitate with the grooves on the other when the disengagement apparatus is in said disconnect position. The complimentary grooves and ridges of the capture dies and interface are preferably smoothly-curved in axial section whereby, in said disconnect position of the disengagement apparatus, relative axial movement of said first and second parts in a tool separation direction displaces the capture dies radially outwardly, inter-digitating said complimentary grooves and ridges of the capture dies and die retention sleeve.

In a further preferable embodiment, the windows comprise abutment elements that abut ledges on said capture dies to restrict inward radial movement thereof. These prevent the dies falling into the internal bore of the tool after disconnection.

Compressive forces are preferably transferred between said first part to said second part through shoulder elements on said first and second parts, and tensile forces are preferably transferred between said first part to said second part through said disengagement apparatus. Torque forces are preferably transferred between said first part to said second part through a splined connection between said first and second parts.

In another preferable embodiment, the interface extends through and above said disengagement apparatus and is sealed to said first part above and below said disengagement apparatus to define a chamber enclosing said disengagement apparatus between said first and second parts, said chamber being filled with oil to lubricate said disengagement apparatus. Preferably, pressure equalisation bellows or a pressure equalisation piston in said chamber cause a pressure change in said oil in response to a pressure change in drilling mud external said tool and in communication with said bellows or piston.

In a further preferable embodiment, the disconnect tool also comprises a controller to control actuation of said disengagement apparatus, the controller comprises:

at least one first sensor that detects at least one dynamic variable and produces at least one output signal based thereon;

at least one second sensor that is adapted to receive signals from an operator at the surface; wherein said controller is adapted to actuate said disengagement apparatus to disconnect the tool when a predetermined series of output signals are produced and a predetermined series of signals are received from the operator at the surface.

Indeed, a disconnect tool in accordance with the second aspect of the invention may also be a selectively operable downhole tool in accordance with the first aspect of the present invention.

In the embodiments in which the sleeve comprises a first and second and a motion sensor is provided to sense relative axial motion of the first and second sleeves the second sensor may comprise said motion sensor and said predetermined series of signals comprises a predetermined series of movements of the drill string that cause a predetermined series of relative movements between said first and second sleeves.

Preferably, the controller forms part of a sensor module, wherein said sensor module further comprises power units and is a self contained electronic control unit and the sensor module preferably includes said motor. The sensor module is preferably a sleeve member within said chamber, wherein said controller and power units are isolated from said oil by seals between said sleeve member and said first part. Preferably, the motor is disposed in a bore of said sleeve member opening into said chamber, the motor being isolated from said oil by seals around an output shaft of the motor. However, said motor can be arranged to function within an oil-filled environment, and this may be preferable to avoid friction between the output shaft and seals thereon. In this event, a high temperature, high pressure cable is required that can itself seal between the oil chamber and the sensor module.

Of course, it is highly undesirable for the tool to disconnect when the operator does not wish the disconnection to take place and/or the tool is not stuck in the well bore. An unintentional disconnection such as this would incur significant financial losses and would disrupt drilling considerably. The controller, power unit and motor are preferably isolated from oil to prevent damage, as these components are essential to the detection and subsequent disconnection of the disconnect tool. It is therefore critical that they remain active to ensure that disconnection only occurs when desired and a strict set of criteria is met.

Preferably, the predetermined series of output signals produced by the sensor(s) are indicative of a stuck tool and the predetermined series of signals received from the operator are confirmatory signals that the operator wishes to commence with disconnection. Only under these conditions will the tool disconnect.

The first sensor preferably comprises at least one accelerometer for measuring the acceleration of the device. In a preferable embodiment, the tool has three accelerometers for measuring axial, radial and rotational acceleration respectively. Each accelerometer is preferably a switch and is in logical state "1" or '0' depending on whether the measured acceleration exceeds, or is below, a predetermined threshold. Preferably, the controller produces a logical '1' or '0' depending on whether the measured acceleration exceeds, or is below, a predetermined threshold.

By measuring acceleration along three axes, the behaviour of the BHA can be inferred. Therefore, the predetermined series of output signals from the sensors received by the controller to actuate disconnection can be set to be indicative of a stuck BHA and not represent the BHA in any other condition (e.g. lying dormant at the bottom of the well bore). By the careful choice of the predetermined series of output signals, the disconnect tool will be incapable of disconnecting when the BHA is not stuck in the well bore.

Preferably, the tool has at least one compression sensor for measuring compression of the drill string. The compression sensor preferably measures compression by measuring the displacement between two internal components of said tool. Preferably, the compression sensor is a strain gauge. Preferably, the compression sensor is a switch and is in logical state '1' or '0' depending on whether the measured compression exceeds, or is below, a predetermined threshold. The controller preferably produces a logical '1' or '0' depending on whether the measured compression exceeds, or is below, a predetermined threshold.

The compression sensors are preferably capable of receiving compression signals from the operator at the surface. The purpose of incorporating the compression signals in the disconnect process is to ensure, with confirmatory signals, that the operator wishes to commence with the disconnection. Again, this will ensure that the tool does not disconnect undesirably.

Thus, the tool is preferably a disconnect tool for incorporation in a drill string between a downhole assembly and a drill pipe to selectively disconnect the downhole tool from the drilling pipe when the downhole assembly is stuck in a wellbore, said disconnect tool comprising:

a first part for connection to said drilling pipe and a second part for connection to said downhole assembly;

a disengagement apparatus to release connection between said first and second parts; wherein said controller is adapted to change the tool from an active state to a disconnect state when said at least one output signal has satisfied at least one criterion indicating that the tool is stuck, and said controller is adapted, when in said disconnect state, to actuate said disengagement apparatus to disconnect the tool when a disconnect operator signal is received by said second sensor.

This logical process requires that a specific set of events must occur before the disconnect tool disconnects. In particular, a criterion must be met regarding the operational state of the tool and a criterion must be met with respect to the operator's intentions, with the tool preferably only disconnecting when the BHA is stuck and the operator wishes to commence with the disconnect sequence.

It is preferable that prior to entering said disconnect state, the tool enters a listening state;

said tool changing from said listening state to said disconnect state when the tool has been in said listening state after a first period of time and dependent upon receipt or non-receipt of a transfer operator signal by said second sensor in said first period of time. Said tool preferably returns to said active state unless said transfer operator signal is received by said tool in said first time period.

Preferably, the controller actuates the disengagement apparatus to disconnect the tool when said disconnect operator signal is received by said second sensor during a period of time following the controller entering said disconnect state. Between said listening and disconnect states, the tool preferably enters a countdown state, said tool changing from said countdown state to said disconnect state upon receipt of a countdown operator signal received by said second sensor during a period of time in said countdown state. Preferably, the, or each operator signal is a compression of the drill string and said at least one second sensor is a compression sensor.

The listening and countdown states allow for fail-safe periods where the disconnect sequence can be abandoned. Within each of these states, the operator must produce a compression signal (or not produce a compression, in alternative embodiments) to confirm that disconnection is still desired. Such a system prevents accidental or undesirable disconnection occurring at the expense of the drilling budget and schedule.

The compression sensor preferably measures compression by measuring the displacement between said two parts or the compression sensor is preferably a strain gauge. Alternatively, the compression sensor is a switch and is in logical state '1' or '0' depending on whether the measured compression exceeds, or is below, a predetermined threshold. Preferably, the controller produces a logical '1' or '0' depending on whether the measured compression exceeds, or is below, a predetermined threshold.

The transfer operator signal is preferably a continuous compression signal and the countdown operator signal is preferably a series of periodic compression signals. Preferably, the disconnect operator signal is equal to said transfer operator signal.

Preferably, the at least one sensor is an accelerometer and preferably, the tool has three accelerometers for measuring axial, radial and rotational acceleration respectively. Preferably, the, or each accelerometer is a switch and is in logical state '1' or '0' depending on whether the measured acceleration exceeds, or is below, a predetermined threshold. The controller preferably produces a logical '1' or '0' depending on whether the measured acceleration exceeds, or is below, a predetermined threshold.

Preferably, the criterion indicating a stuck tool is that the measured axial acceleration exceeds a predetermined threshold, the measured radial and rotational accelerations are below a predetermined threshold, and the measured compression periodically exceeds a predetermined threshold.

Preferably, A disconnect tool as claimed in any of the second aspect of the present invention is also A disconnect tool as claimed in the first aspect of the present invention.

A tool according to the first aspect of the present invention may comprise a circsub, said circsub tool comprising a body having a throughbore receiving a piston movable between open and closed positions to control ports in the body selectively connecting the throughbore with the wellbore, said motor driving said actuator to enable or disable movement of the piston to said open position.

BRIEF DESCRIPTION OF THE DRAWINGS

Embodiments of the invention are further described hereinafter with reference to the accompanying drawings, in which:

FIGS. 1B, 1O and 1D are cross-sectional views taken along the lines A-A, O-O and C-C, respectively, of FIG. 1a;

FIG. 5A is a side view of the disengagement apparatus when it is in an 'engaged' arrangement with the mandrel, and FIG. 5B is a corresponding partial cross-sectional view;

FIG. 6A is a side view of the disengagement apparatus immediately following the release of the mandrel, and FIG. 6B is a corresponding partial cross-sectional view;

FIGS. 9A, B and C are a side view and two sectional views along the line A-A of FIG. 9A, FIG. 9B showing in an open position and FIG. 9C showing in a closed position, of a circulating sub in accordance with an aspect of the present invention;

DETAILED DESCRIPTION

Figure 1A:
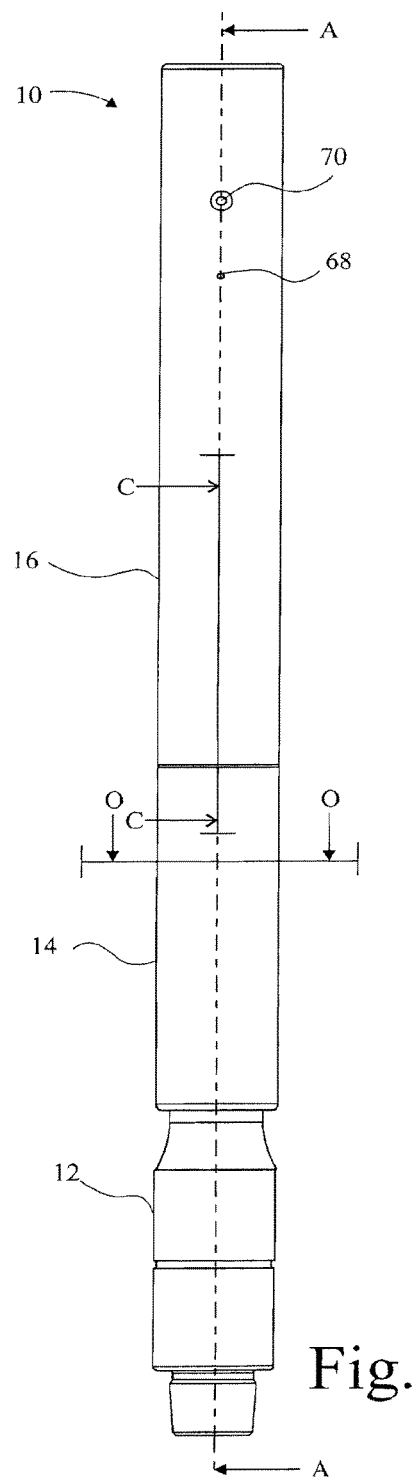
FIG. 1A is a side view of a disconnect device according to the present invention.
Figure 1B:
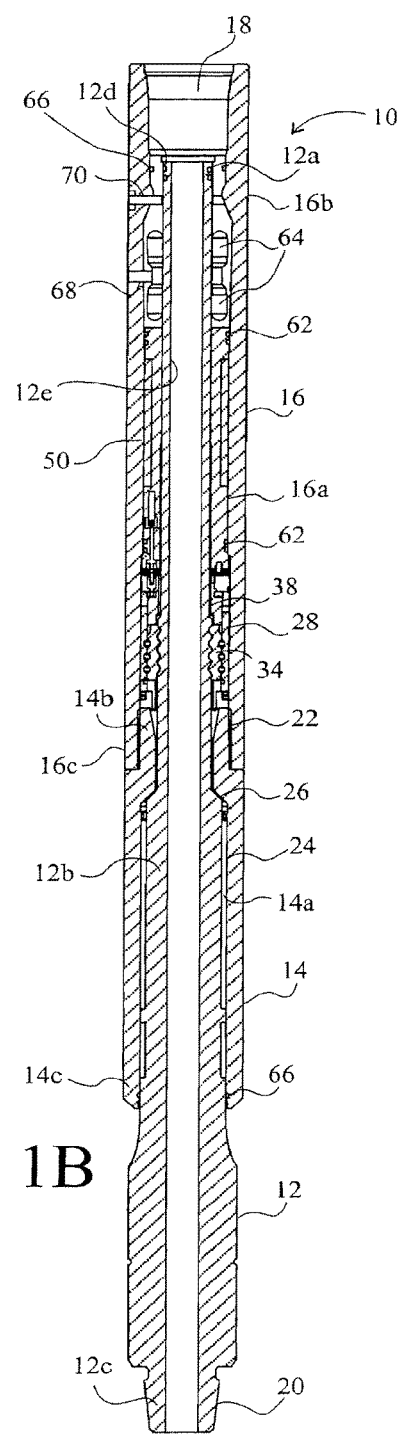
Figure 1C:
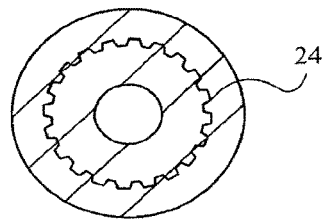

A disconnect device 10 in accordance with the present invention is shown in FIG. 1A. FIG. 1B shows a cross section of the device 10 of FIG. 1A along line A-A. With reference to FIGS. 1A and 1B, the device 10 is generally cylindrical and has a mandrel 12 that is located within a bore 14a of a spline housing 14 and a bore 16a of a trigger housing 16. The spline housing 14 (also referred to as a second part) surrounds a middle portion 12b of the mandrel 12 whilst the trigger housing 16 (also referred to as a first part) surrounds an upper portion 12a of the mandrel 12. An upper portion 14b of the spline housing 14 has a smaller diameter than the trigger housing 16 and is connected in a lower portion 16c of the trigger housing 16. The interface between the upper portion 14a of the spline housing 14 and the lower portion 16c of the trigger housing 16 forms a housing connection 22 that prevents axial movement therebetween.

A lower portion 12c of the mandrel 12 extends below the spline housing 14 and is shown exposed. The device 10 has a top connector 18 on the upper portion 16b of the trigger housing 16 that connects the device 10 to an upper part of a drill string (not shown) and a bottom connector 20 on the lower portion 12c of the mandrel 12 that connects the device 10 to a lower part of the drill string (not shown). The lower drill string part will typically be connected to, or at least be closely connected to, a bottom hole assembly (BHA) during operation. As described below, the disconnect device 10 acts as a releasable member between the upper drill string part and the lower drill string part comprising the BHA.

Figure 2:
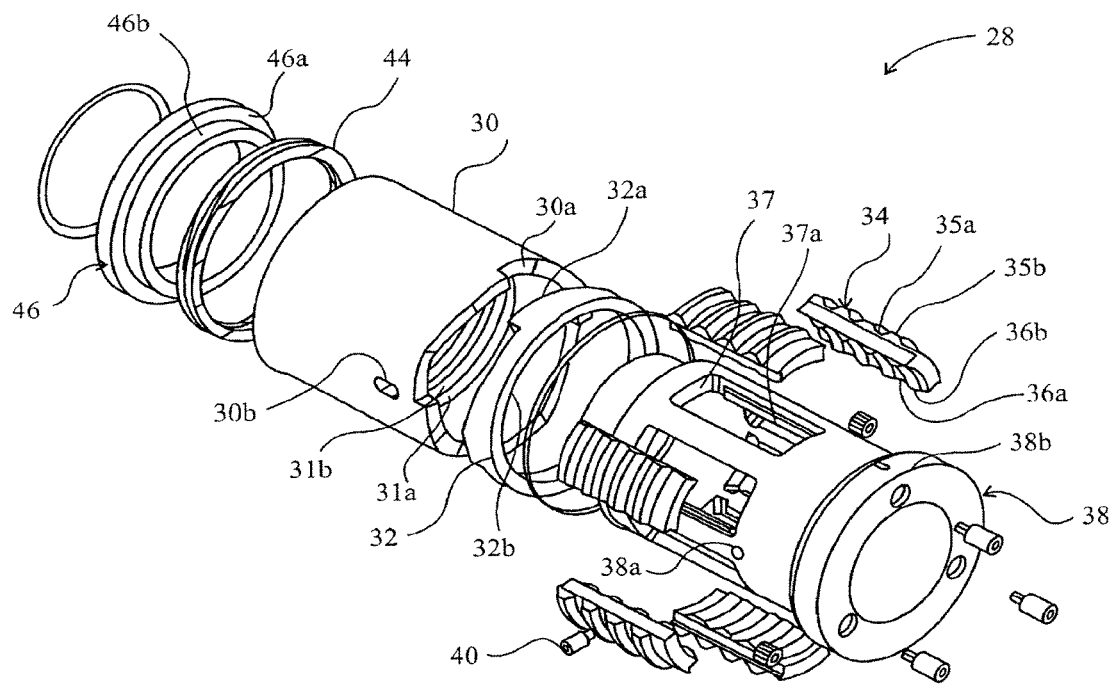
FIG. 2 is an exploded view of a disengagement apparatus according to the present invention.

Intermediate the trigger housing 16 and the mandrel 12, above the spline housing 14, there is located a disengagement apparatus 28 FIG. 2 shows a detailed exploded view of the disengagement apparatus 28. The disengagement apparatus comprises a die retention sleeve 30 within which is disposed a clutch housing 38. When assembled, the clutch housing 38 is located between the mandrel 12 and the die retention sleeve 30. The inner surface of the die retention sleeve 30 has a grooved or ribbed profile made up of several concentric grooves 31a and ridges 31b. A plurality of capture dies 34, having complimentary outer grooves 35a and ridges 35b, are disposed within windows 37 around the circumference of the clutch housing 38. The windows 37 comprise abutment elements 37a that prevent the capture dies 34 from passing entirely through the windows 37 radially inwards, but do not prevent or restrict movement radially outwards. The clutch housing 38 is prevented from rotating about its longitudinal axis with respect to the die retention sleeve 30 by location pin 40. The location pin 40 passes through a longitudinal slot 30b in the surface of the die retention sleeve 30 and is fixed in sockets 38a in the clutch housing 38.

Figure 1D:
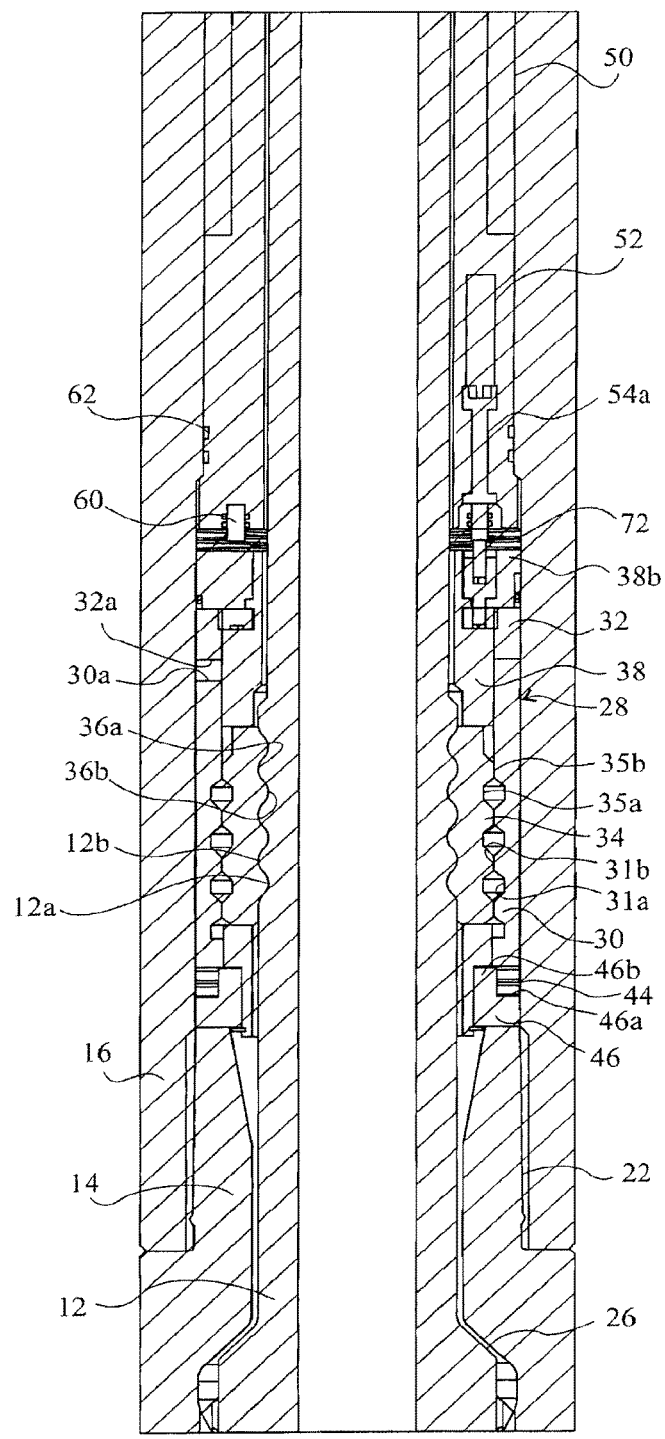

The portion of the mandrel 12 that is in radial alignment with the die retention sleeve 30 (when assembled) also has a grooved face made of grooves 12a and ridges 12b (see FIG. 1D). The inner surfaces of capture dies 34 have inner grooves 36a and ridges 36b that are complimentary to the grooves 12a and ridges 12b of the mandrel 12. The inner grooves and ridges 36a,b of the capture dies 34 and the complimentary grooves and ridges 12a,b of the mandrel appear smoothly curved when viewed in an axial section. When assembled, the inner grooves 36a and ridges 36b of capture dies 34 can mate with the ridges 12b and grooves 12a respectively of the mandrel 12 such that axial movement is prevented therebetween by interference. Under normal drilling operation, the outer ridges 35b of the capture dies 34 are in abutment with the ridges 31b of the die retention sleeve 30 pressing the capture dies 34 into mutual engagement of the ridges and grooves 36a,b/12a,b. The ridges 31b of the sleeve and the outer ridges 35b of the capture dies 34 have part conical side surfaces whereby the ridges on one surface (31b or 35b) can inter-digitate with the grooves (35a or 31a) of the other when the disengagement apparatus moves into a disconnect position.

An upper portion of the die retention sleeve 30 has a cam feature 30a that is capable of abutting against a complimentary cam feature 32a on a cam collar 32 located above the die retention sleeve 30. The cam collar 32 is retained axially between the upper portion of the die retention sleeve 30 and a flange 38b on an upper edge of the clutch housing 38. The cam collar 32 is free to rotate with respect to the die retention sleeve 30 by the amount allowed by cam features 30a and 32a.

At a lower end of the die retention sleeve 30 a cap 46 axially retains a spring 44 between the die retention sleeve 30 and a flange 46a (FIG. 1D) of the cap 46. When compressed, the spring 44 acts against the die retention sleeve 30 and the flange 46a of the cap 46. A spigot 46b on the cap 46 retains and aligns the die retention sleeve 30 and its ridges 31b with respect to the outer ridges 35b of the capture dies 34.

Figure 10:
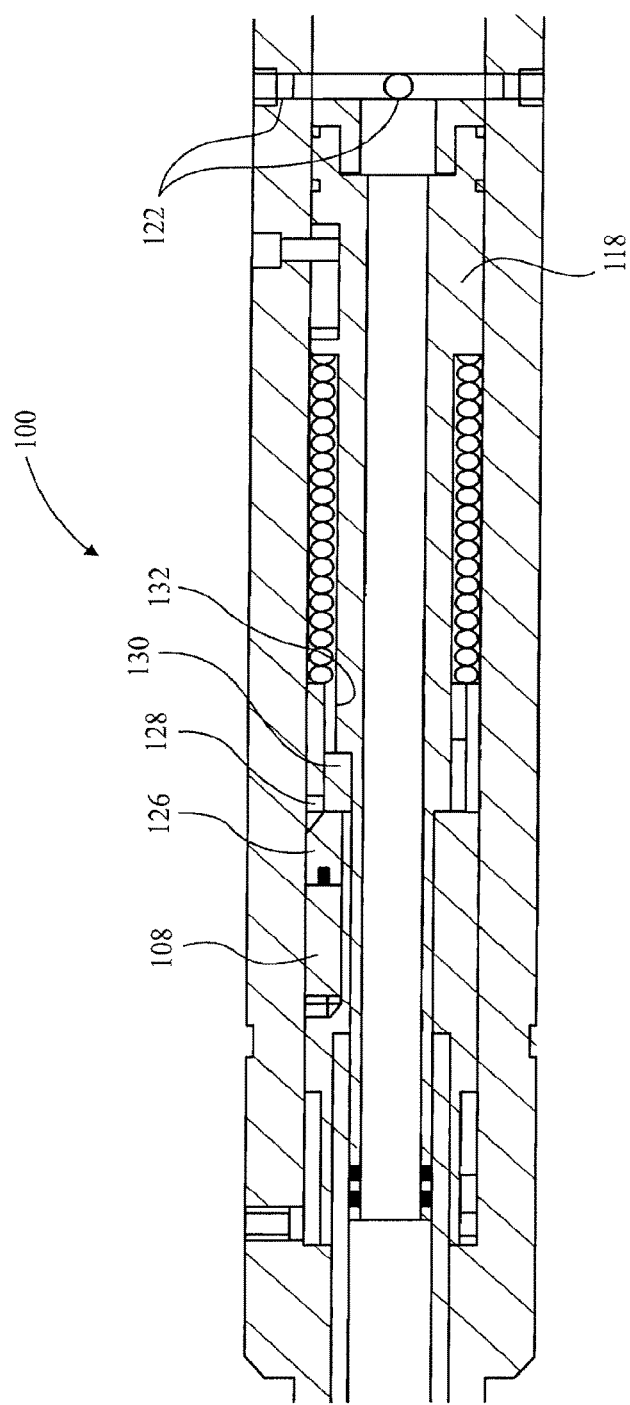
FIG. 10 shows an enlarged view of the circulating sub shown in FIG. 9.

Since the disconnect device 10 is installed intermediate the upper and lower parts of the drill string, the device 10 must be capable of transmitting torque, compression and tensile forces if the BHA is to operate as desired. In the device 10, torque forces are transmitted through the top connector 18 to the spline housing 14 via the housing connection 22 intermediate the trigger housing 16 and the spline housing 14. The torque is then transferred from the spline housing 14 to the mandrel 12 via a spline 24 (see FIG. 10) disposed within spline housing 14.

Compressive forces are also transmitted through the top connector 18 to the trigger housing 16. From the trigger housing 16, they are transmitted to the spline housing 14 via housing connection 22. From the spline housing 14, however, compressive forces are transmitted to the mandrel 12 through a shoulder 26 of the mandrel 12. The shoulder 26 is located intermediate a radially narrow upper portion of the mandrel 12 and a radially wide lower portion of the mandrel 12. The compressive forces are then transmitted from the mandrel 12 to the lower drill string portion via the bottom connector 20.

Under tension, however, no load is taken by the shoulder 26. Instead, the tension exerted by the mandrel 12 is transmitted to the clutch housing 38 through the mating of the grooves 36a and ridges 36b of the capture dies 34 with the ridges 12b and grooves 12a respectively of the mandrel 12. Since the clutch housing 38 is retained within the die retention sleeve 30, which is disposed above the spline housing 14, the tension is transmitted from the clutch housing 38 to the trigger housing 16 via the spline housing and housing connection 22. The tension is then transmitted to the upper drill string via top connector 18.

Located above the disengagement apparatus 28 within the trigger housing 16 is a sensor module 50. The sensor module 50 contains the drive, control and actuation components that cause rotation of the cam collar 32. The sensor module 50 is shown in FIGS. 3A-3C and FIG. 4 shows the interaction between the sensor module 50 and the cam collar 32. The sensor module 50 contains an electric motor 52 that has a gearbox 54. The gear box 54 is drivably connected to a drive axle 56 that protrudes from a bottom end 50a of the sensor module 50. The drive axle 56 is drivably connected to a pinion 64 such that a relative axial movement can occur between the drive axle 56 and pinion 64 whilst maintaining the drivable connection. As shown in FIG. 4, the pinion 64 engages with a toothed inner surface 32b of cam collar 32. Operation of the motor 52 therefore causes rotation of the cam collar 32 relative the die retention sleeve 30. Further motors may be disposed around the circumference of the sensor module 50 (see second drive axle 562, for example, in FIG. 4). In alternative embodiments of the invention, any suitable actuator may be used in the place of the one or more motors.

With reference to FIGS. 5A, 5B, 6A and 6B, rotation of the cam collar 32 enables the die retention sleeve 30 to move upwards under the bias of spring 44. This is because the uppermost position of the die retention sleeve 30 is limited by abutment between the cam features 32a and 30a. As the cam collar 32 rotates, the profile of cam feature 32a changes relative the cam feature 30a for any given point on the circumference. Since the spring 44 biases the die retention sleeve 30 to its uppermost position, the rotating cam collar 32 allows the die retention sleeve to move upwards to the position shown in FIG. 6A. This movement allows the capture dies 34 to move radially outwards and release the mandrel 12, as described below with reference to FIGS. 5A and 5B.

FIG. 5B shows a cross-sectional view along the line D-D of FIG. 5A. FIG. 6A shows a cross-sectional view along the line F-F of FIG. 6A. FIGS. 6A and 6B show the disengagement apparatus 28 in a position that would disengage the mandrel 12 (if present).

In FIG. 5B, the outer ridges 35b of the capture dies 34 are in abutment with the ridges 31b of the die retention sleeve 30. In this position, the capture dies 34 would be in a mating arrangement with the grooves 12a and ridges 12b of the mandrel 12 such that the mandrel 12 would not move relative the disengagement apparatus 28. This 'engaged' arrangement is described above with reference to FIG. 1D.

In FIG. 6B, the die retention sleeve 30 has moved upwards relative the cam collar 32 and the clutch housing 38. Consequently, the ridges 31b of the die retention sleeve 30 are no longer in abutment with the outer ridges 35b of the capture dies 34. Instead, the outer ridges 35b of the capture dies 34 are in radial alignment with the grooves 31a of the die retention sleeve 30. The capture dies 34 are then able to move radially outwards and do so when a tension is applied to the housing 16 when it is desired to separate the coupling between the two parts of the disconnected device 10. The smoothly curved surfaces of the inner grooves and ridges of the capture dies 36a,b and the complimentary smoothed surface of the grooves and ridges of the mandrel 12,b facilitate the radially outward movement of the capture dies when tension is applied. The wave-like structure of the outer grooves and ridges 35a,b of the capture dies 34 and the grooves and ridges 31a,b of the die retention sleeve 30 allow the mating arrangement shown in FIG. 6B. With the capture dies 34 in the position shown in FIG. 6B, the axial path of the mandrel 12 (including the axial path of the grooves 12a and ridges 12b) is clear and the mandrel 12 is no longer coupled to the rest of the device 10. At this point, the mandrel 12 is disconnected from the remainder of the device 10 and will either move downwards under the influence of gravity, or, in the case of a stuck tool, remain in place whilst the remainder of the device 10 is withdrawn upwards and recovered.

The above describes the mechanical process by which an upper portion of a drill string is disconnected from a lower portion. A further aspect of the present invention is directed towards a system that will only allow the disconnection to proceed when specific predetermined criteria are met. The following describes this system with reference to the above described disconnect device, however the skilled person will appreciate that other disconnect devices may be used without deviating from the scope of the invention.

Figures 3A, 3B:
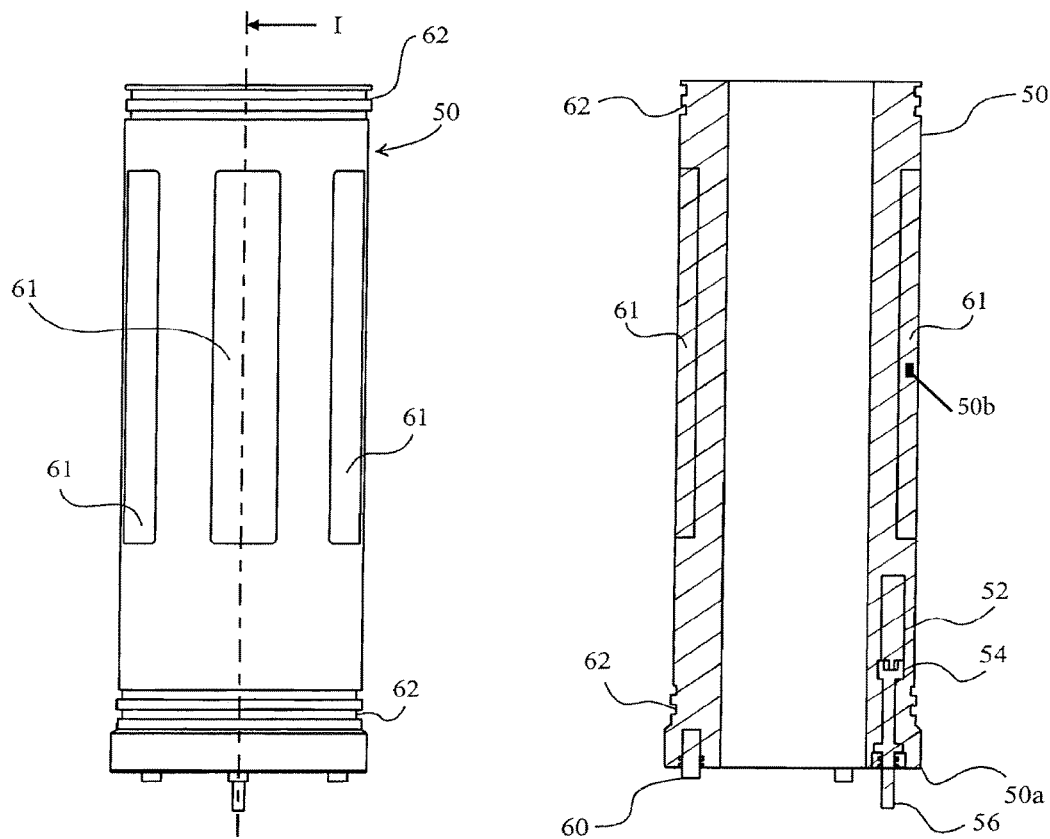
FIG. 3A is a side view of a sensor module according to the present invention.
FIG. 3B is a cross-sectional view taken along line I-I of FIG. 3A.
Figure 3C:
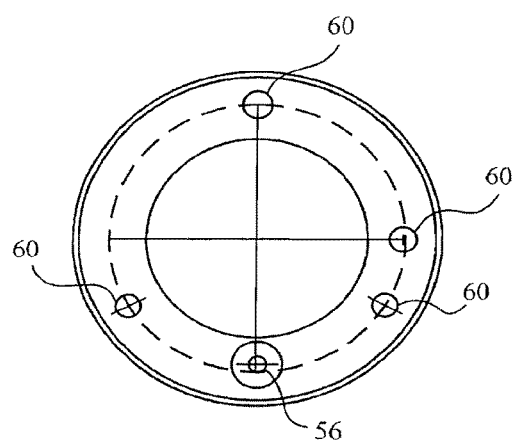
FIG. 3C is a bottom view of the sensor module of FIG. 3A.
Figure 4:
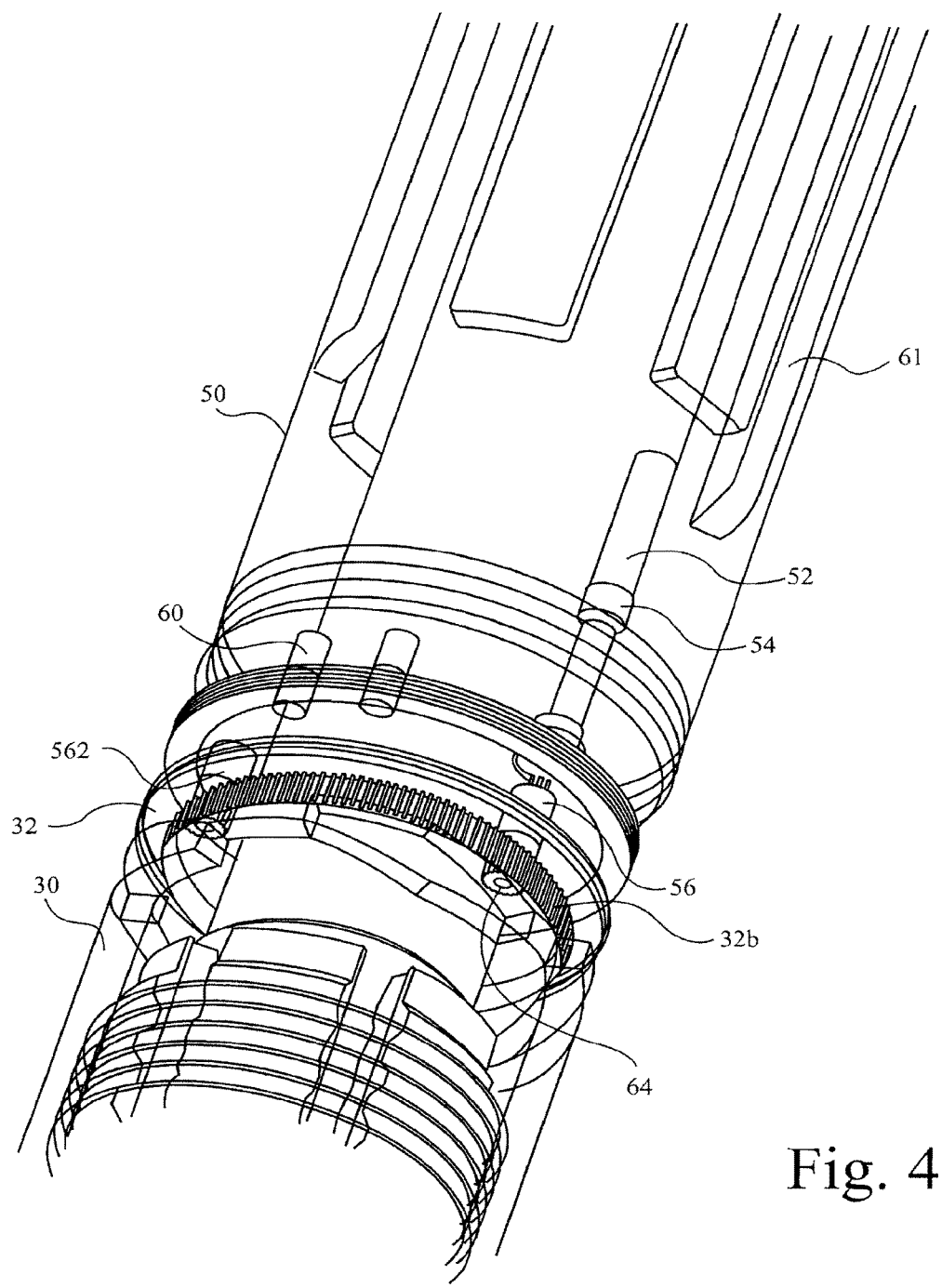
FIG. 4 is a perspective view of part of the disconnect device showing the interface between the sensor module and disengagement apparatus according to the present invention.

With reference to FIGS. 3B and 3C, it can be seen that the sensor module 50 comprises a plurality of sensors 60. The sensors may include proximity sensors, pressure sensors, accelerometers and temperature sensors. Although FIG. 3C shows four such sensors 60, the skilled person will realise that this is in no way limiting to the actual number of sensors 60 that might be employed. The sensors 60 may be capable of measuring a dynamic variable across a continuous spectrum or alternatively they may be capable of detecting whether the dynamic variable is above or below a predetermined threshold. The sensors 60 are connected to one or more microprocessors in one or more pods 61 that are capable of evaluating the output signals from the sensors 60 and carrying out logic functions to permit and control disconnection. The one or more microprocessors therefore act as a controller for controlling disconnection. Alternatively, the sensors may also be mounted directly on circuit boards or other arrangements in pods 61 disposed around the sensor module 61. One or more battery packs 50b embedded within the sensor module 50 provide power to the sensors 60 and microprocessors, as well as to the motor(s) 52 and may be embedded within one of the pods 61. The sensor module 50 is sealed by seals 62 from high hydrostatic pressures. Thus, the sensor module 50 is a self contained electronic control unit that is capable of determining certain physical conditions and actuating disconnection based thereon.

It is to be mentioned that in a downhole environment, a degree of redundancy and/or voting may be desirable to mitigate individual component failure. For example, in the case where three accelerometers are used, and the outputs from two accelerometers are in agreement with one another, but are in disagreement with the third, it might be desirable for the microprocessors to disregard the output from the third accelerometer as it represents a minority proportion of the entire data set.

The internal components of the device 10 are generally lubricated by oil, however the sensor module 50 is sealed by seals 62 to protect its delicate components. Oil can be introduced into the device 10 through a port 70 to lubricate the internal components between seals 66. Mandrel seals 12d prevent the oil entering the bore 12e of the mandrel 12. Bellows 64 allow the variable pressure of the drilling mud outside of the device 10 to cause a proportional pressure change in the oil. The bellows 64 also act such that when the device 10 is under compression, they receive a small amount of oil. During disconnection, oil is initially drawn from the bellows 64 to allow the mandrel 12 to separate easily from the remainder of the device. In alternative embodiments of the invention, a pressure equalisation piston may be used in place of the bellows to equalise the drilling mud pressure and the oil pressure.

To protect the clutch housing 38 and capture dies 34 from the high compressive loads encountered whilst drilling, the device 10 is made telescopic to a small degree. A spring 72 separates the clutch housing 38 from the sensor module 50 and holds the two components apart in the absence of a substantial force. If a substantial weight is applied to the device 10, then the spring 72 will compress and the clutch housing 38 and sensor module 50 will move closer to one another. In this state, the device 10 is said to be under compression.

Proximity sensors 60 can be a simple switch, and the small relative movement between the components can actuate such a switch. If preferred, however, the movement can be eliminated altogether and the proximity switch changed to a strain sensor that detects compression of the disconnect device 10.

Proximity sensors 60 can detect this relative movement and can produce an output signal either indicating the degree of compression (i.e. the magnitude of the relative displacement between the clutch housing 38 and the sensor module 50), or that the degree of compression has exceeded a predetermined threshold and that the tool is under 'compression'. In the case where a predetermined threshold is used, any compression that does not exceed the predetermined threshold will be measured as 'no compression'.

Pressure sensors 60 in the sensor module 50 might measure oil pressure which is proportional to the hydrostatic pressure by virtue of bellows 64. Again, the sensors 60 might measure oil pressure across a continuous spectrum or simply measure if it is below or exceeds a predetermined threshold. Alternatively, instead of absolute pressure, the sensors 60 may detect differential pressure between the through bore of the drill string and external pressure of the well bore.

Temperature sensors 60 may be used to determine whether the temperature is within the range that it is safe to operate the device 10 and may be used to shut down the microprocessors if temperatures exceed a predetermined threshold. Additionally, the microprocessors could be used to control certain temperature dependent characteristics of internal electronic devices based on the measured temperature.

Accelerometers 60 may also be used to monitor vibrations within the device 10 along any given axis. For example, the accelerometers 60 can provide an indication as to whether the tool is drilling, when there is no movement, when there are jarring operations, or when it is rotating. Although all the sensors employed are illustrated as sensors 60, sensors that do not require access to the external environment, such as accelerometers, may be disposed within the sensor module itself, rather than at the locations 60 illustrated.

The microprocessors collate the output data from the various sensors 60 and put the device into a particular 'mode' depending on the specific combination of data. The device's 'modes' are described below, assuming that the sensors 60 are operating on a threshold criterion. In particular, each sensor 60 will output a '1' if its measured variable exceeds a predetermined threshold, and output a '0' if its measured variable is below the predetermined threshold. Alternatively the microprocessors can convert an analogue signal from the sensors 60 to a logical '1' or '0' as desired. The microprocessors can also be selective in which sensor outputs are considered depending on which mode it is in.

A visual display at the surface can be optionally used to indicate what mode of operation the device 10 is in and may also provide instructions to guide the operator. However, it is an aspect of the present invention that the disconnect device 10 can work isolated from the surface other than for final disconnect instruction signals.

The device 10 is in 'Active Mode' when the tool goes below the rotary table of a drilling rig or platform. The microprocessors switch the device 10 into Active Mode when the output signals from the pressure sensors 60 indicate that the device is below the rotary table. This will be determined by the selection of the predetermined pressure threshold, the level of which can be adjusted by the operator. The predetermined thresholds of all the sensors 60 can be set such that when the device 10 is being stored at the surface, the microprocessors act to switch the unit off, based upon the sensor outputs. The device 10 should remain in Active Mode under all normal operation. 'Normal operation' may include the BHA running in the hole, the BHA static at the casing shoe, the BHA pulling out of the hole and other common operations such as reaming, drilling, circulating and wiping.

If the BHA becomes stuck, the accelerometers 60 will not read any rotational or radial acceleration, but may still read axial acceleration caused by jarring. The output signals from the accelerometers 60 will be distinctly different when the BHA is stuck compared to the output signals produced during normal drilling operations. More specifically a stuck BHA will mean that accelerations measured within the sensor module 50 are, at most, vibration-like. During normal drilling, accelerations measured within the sensor module 50 will be representative of large axial and radial movements with 360° rotations. When vibration-like accelerations are measured, however, the microprocessors will consider data from the compression sensor to confirm that the BHA is stuck. If the BHA is stuck, and the operators are attempting to free it by jarring, the compression sensor 60 will measure the periodic 'jar spikes'. In combination with the accelerometer outputs, the microprocessors will interpret this data to mean that the BHA is stuck, provided that the device is in Active Mode. The microprocessors will then put the device 10 into 'Listening Mode'.

When the device is in Listening Mode, the operator may have given up trying to free BHA and made the decision to disconnect. To commence disconnection, a signal must be sent to the device 10 whilst it is in Listening Mode. In one embodiment of the invention, the signal involves the operator slacking off the upper drill string to put the device under a continuous steady compression. With no more jarring, all the accelerometers 60 should read '0' and the steady compression caused by the slack drill string will be measured by the compression sensor 60. If these conditions are constant for a predetermined time period (e.g. 15 minutes) whilst the device 10 is in Listening Mode, the microprocessors will change the device mode to 'Countdown Mode'.

During Countdown Mode, a timer will begin a countdown of a predetermined time period. Within that time period, the operator can send a signal to the device to abort the countdown and reset the device 10. This may be done, for example, by the operator lifting and tensioning the drill string once again. Alternatively, if the operator does not take any further action, and leaves the device 10 under compression for the entire predetermined time period, the microprocessors will move the device into 'Disconnect Mode'.

The Disconnect Mode allows for one final confirmation signal from the operator that they wish the disconnect sequence to begin. At this time, the operator has one final chance to abort the process and reset the device 10. In one embodiment, for example, the confirmation signal might involve the operator producing a series of compression signals (e.g. 3) within a predetermined time period (e.g. 10 minutes) by sequentially tensioning and slackening the drill string. Of course, other embodiments are possible where other mechanical signals can be used to confirm the operator's intentions during Disconnect Mode. If the microprocessor receives data from the various sensors 60 that corresponds to the predetermined conditions produced by the confirmation signal, the microprocessors operate the motor 52 and begins the disconnect sequence described above.

Turning to FIGS. 7A and B, an alternative arrangement of the disconnect device of FIGS. 1 to 6 is shown in which the device 10' does not employ the cam collar of the previous embodiment. The same reference numerals are employed below, except with a prime' when the component is modified. Here, the retention sleeve 30' has a flange 30'c having threads 30'a that are threaded on complementary threads 46'c of cap 46' (forming a part of the clutch housing 38'). The other end 30'd of the retention sleeve 30' has internal straight splines 30'f against which bears splines 56'd on a pinion gear 56'a on shaft 56' of motor 52 and gearbox 54. Pinion gear 56'a has a coarse internal thread 56'b engaged with a corresponding thread of the shaft 56'.

FIG. 7A shows the tool in normal use. The pinion is received in a cylindrical pocket 38'b of the clutch housing 38' which pocket, at one end, is splined in correspondence with the splines of pinion 56'a. Thus, in the position shown in FIG. 7A, the pinion is unable to rotate about its axis, being fixed by the splines 38'c. Consequently, since it is also in engagement with the splines 30'f of the retention sleeve 30', it too is unable to rotate and the sleeve is held in position with its ridges 31b in conjunction against outer ridges 35b of the capture dies 34. This in turn holds the inner ridges 36b of the capture dies in engagement with the grooves 12a of the mandrel 12, preventing the mandrel 12 from being withdrawn (leftwardly in FIG. 7A) from the device 10'.

Figure 7B:
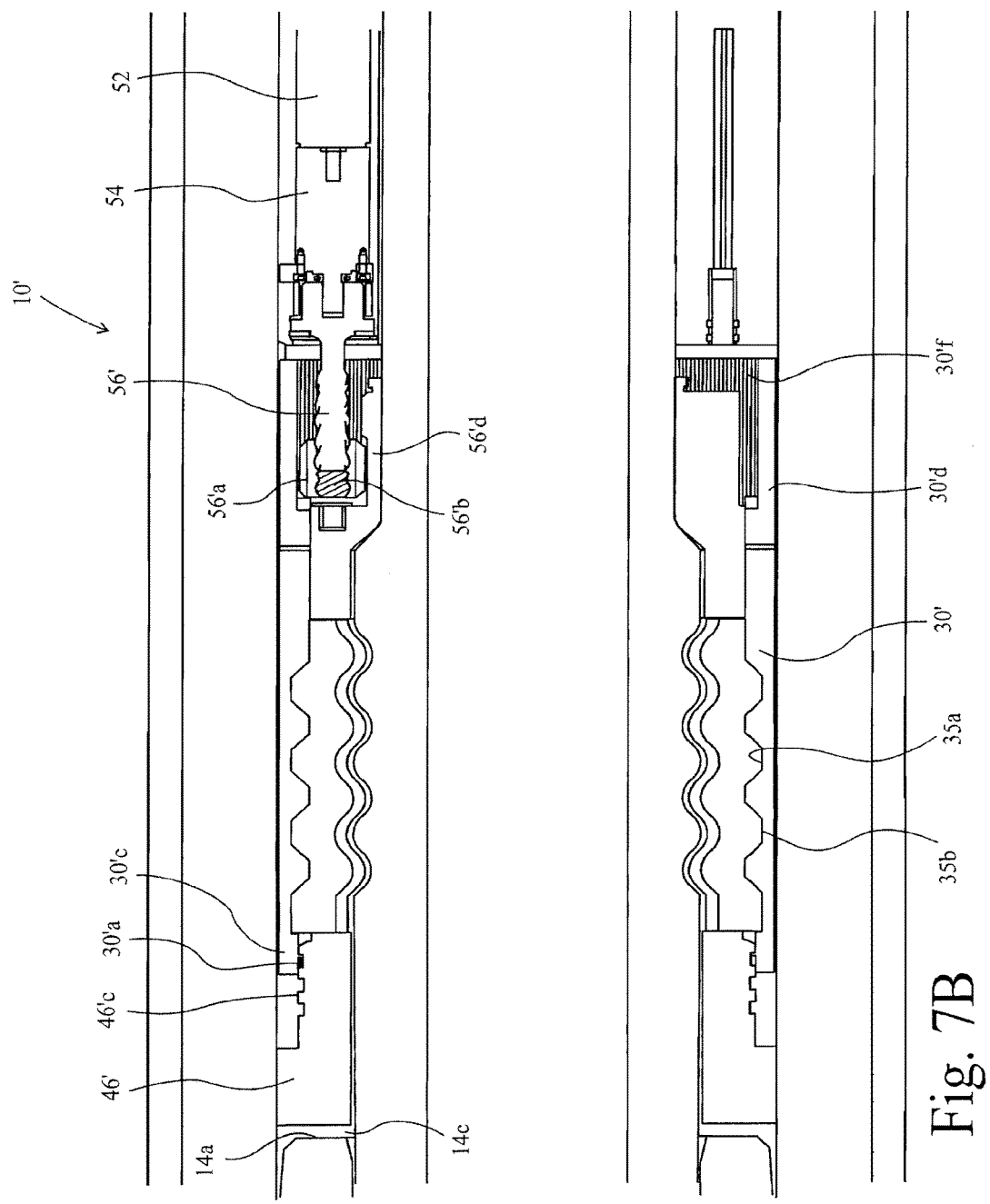
FIGS. 7A and B are partial sections in two positions through an alternative embodiment of a disconnect tool in accordance with aspects of the present invention.
Figure 8:
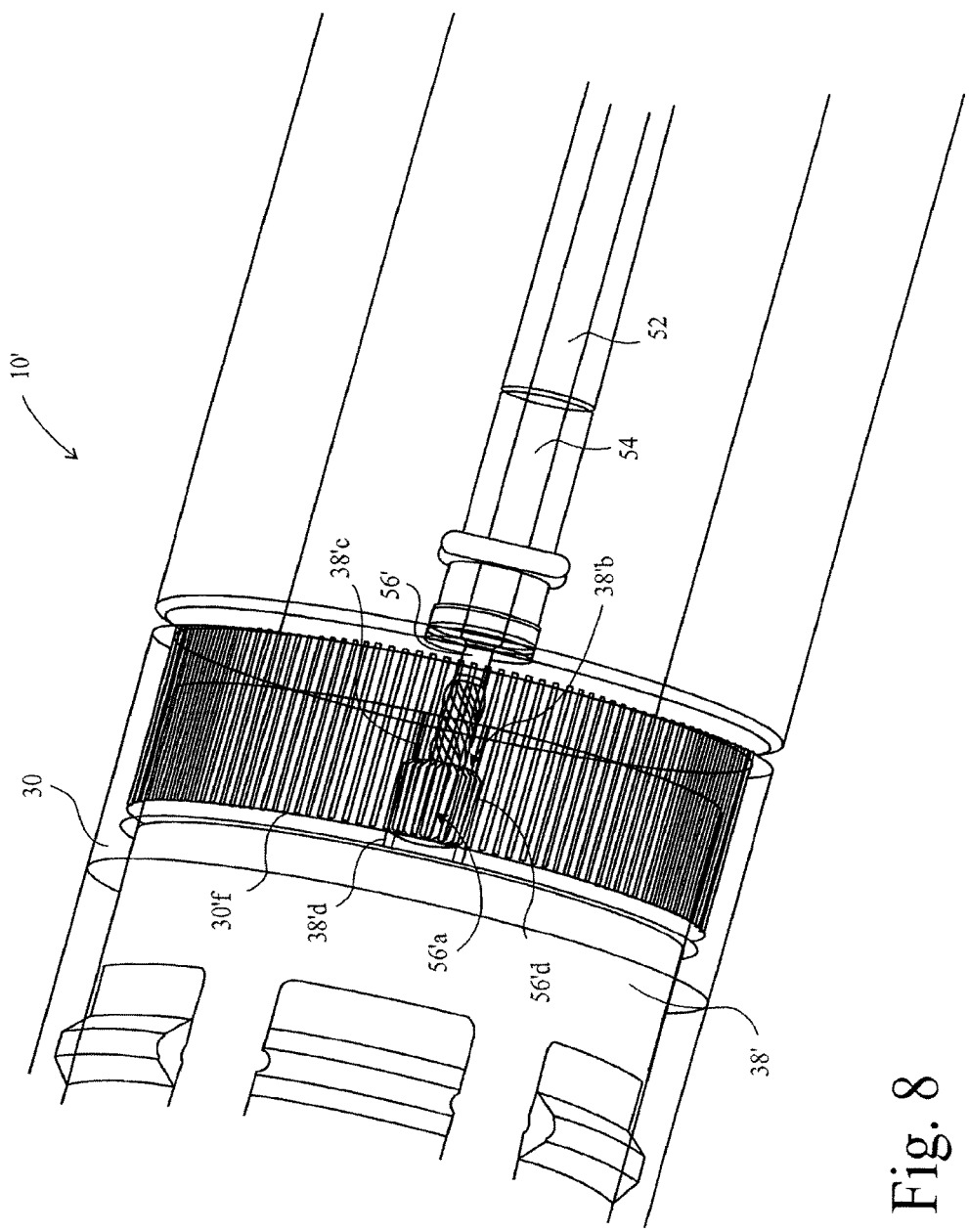
FIG. 8 is a perspective transparent view of part of the tool of FIG. 7.

In the position shown in FIG. 7A, the device is shown under tension, the weight of the mandrel being supported through the disengagement apparatus 28' by cap 46' seated on nose 14a of the spline housing 14. In this event, there is also a radially outwardly directed force on the capture dies 34, themselves pressing radially outwardly on the die retention sleeve 30'. This would prevent the sleeve from rotating. Consequently, when it is desired to effect a disconnection, the device is placed in compression, so that the weight of the mandrel and the components beyond it is taken on the shoulders 26 (not visible in FIGS. 7 and 8). A small gap 14c then appears (see FIG. 7B) between cap 46' and nose 14a and the strain on the disengagement apparatus is relieved. When the motor 52 rotates in one direction, the pinion 56'a is unable to rotate so it is instead driven axially to the position shown in FIG. 7B by the thread on the shaft 56' engaging its thread 56'b. This proceeds until the pinion gear clears the splined part 38'c of the pocket 38'b and enters clear part 38'd in which it can rotate about its axis. The pinion gear no longer progresses along the shaft, instead preferring to rotate with the shaft 56'. In any event, it cannot progress further without contacting the base of the pocket 38'b.

Thus in the position shown in FIG. 7B, the pinion gear can rotate and, in doing so, it starts to spin the retention sleeve about its own axis being the longitudinal axis of the tool 10'. This rotation progressively unscrews the retention sleeve 30' from the cap 46' until such time as the outer ridges 35b of the capture dies coincide with and fall into the grooves 35a of the retention sleeve 30'. At this point, as above, the capture dies release the mandrel 12 so that the device 10 can be separated as described above.

Figure 11:
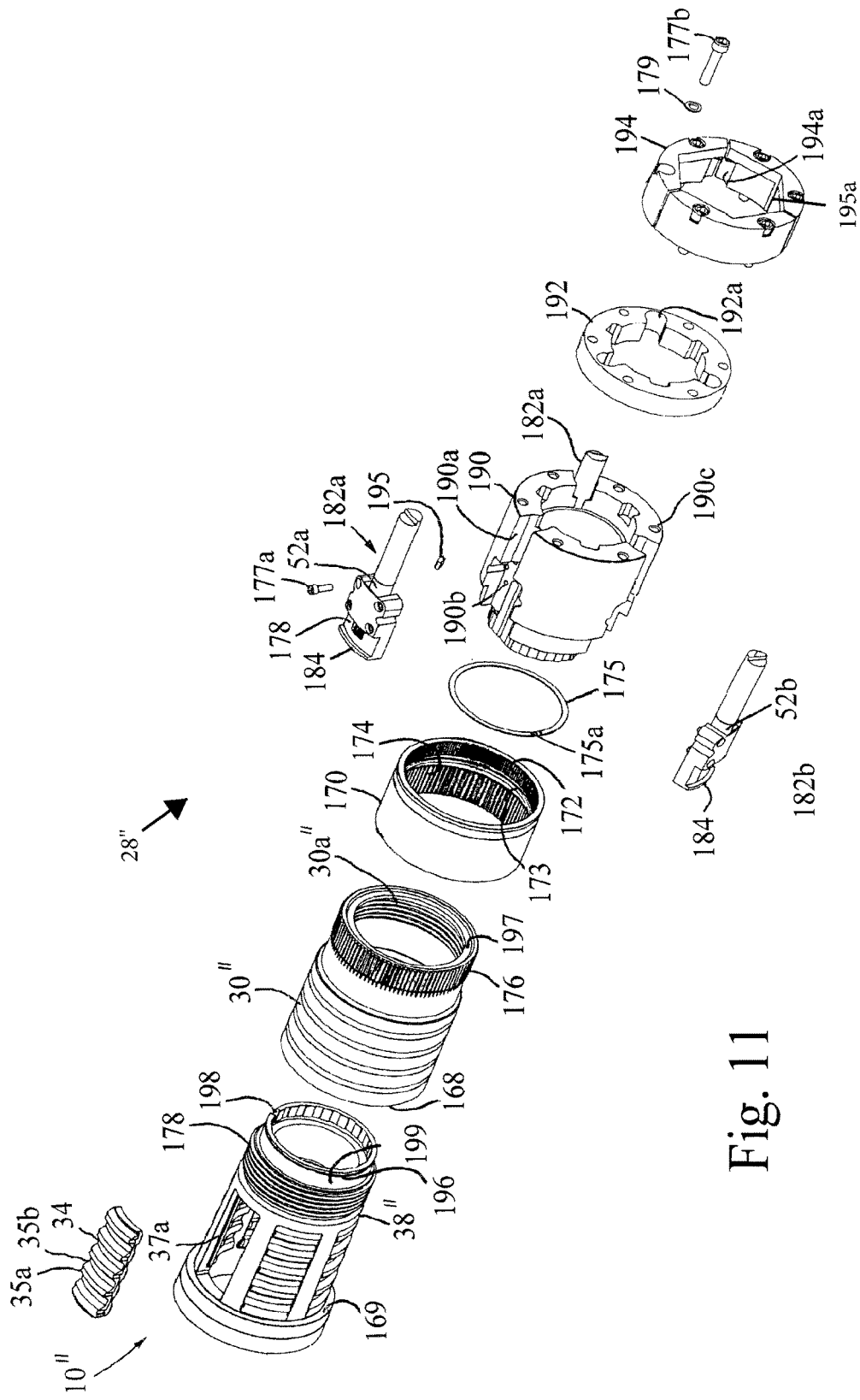
FIG. 11 is an exploded view of a disengagement apparatus according to another aspect of the present invention.

FIG. 11 shows another alternative embodiment of a portion of disconnect device 10" that includes disengagement apparatus 28". Like disengagement apparatus 28 shown in FIGS. 1A and 1B, the disengagement apparatus 28" shown in FIG. 11 can be disposed between the trigger housing 16 (also referred to as the first part) and the spline housing 14 (also referred to as the second part). In the embodiment shown in FIG. 11 retention sleeve 30" is provided with an internal thread 30"a, which internal thread is configured to engage a corresponding external thread 178 on clutch housing 38". Similar to the embodiments shown in FIGS. 1-10, device 10" includes capture dies 34 having outer ridges and grooves 35a, 35b. The capture dies are disposed in windows 37 when device 10" is assembled. The movement of capture dies 34 within windows 37 is limited by abutment elements 37a, which prevent capture dies 34 from moving radially inwardly within clutch housing 38". Clutch housing 38" does not limit radially outward movement of the capture dies, however. When device 10" is assembled retention sleeve 30" is screwed onto clutch housing 38", so that ridges and grooves on the internal surface of retention sleeve 30"

(not shown) align with, respectively, ridges 35*a* and grooves 35*b* on capture dies 34. Similar to the embodiment shown in FIGS. 7-9, the disconnection is actuated by rotating retention sleeve 30" with respect to clutch housing 38", so that they move axially with respect to one another by virtue of engaging screw threads 30"*a*,178. This axial movement causes ridges 35*a* to align with the grooves on the inner surface of retention sleeve 30", so that capture dies 34 are allowed to move radially outwardly in windows 37, thus allowing device 10" to be disconnected from mandrel 12 (not shown).

When device 10" is assembled external splines 176 on retention sleeve 30" engage internal splines 174 on the internal surface of intermediate sleeve 170. In this way intermediate sleeve 170 and retention sleeve 30" can move axially with respect to one another, but rotation of intermediate sleeve 170 about the longitudinal axis of the device 10" is transmitted to retention sleeve 30", and vice versa. Intermediate sleeve 170 is also provided with circumferential rack 172, which rack is configured to engage spindle 178 and brake 180 (see FIG. 12) which are respectively disposed on first and second motor assemblies 182*a,b*. First and second motor assemblies 182*a,b* are disposed within recesses 190*a* (on motor housing 190), 192*a* (on motor housing extension 192) and 194*a* (on processor module retainer 194). They are secured to motor housing 190 with bolts 177*a*, which engage threaded bores 190*b*. Motor housing extension 192 and processor module retainer 194 are secured to motor housing 190 with bolts 177*b*, which engage threaded bores 190*c*. Bolts 177*a*, 177*b* may be provided with washers 179 to improve the load distribution between the head of the bolt and the surface it engages. The washers 179 may advantageously be locking washers to prevent loosening of the bolt due to vibrations.

Each of first and second motor assemblies 182*a*, 182*b* are provided with a flange 184. When device 10" is assembled flanges 184 are disposed within groove 173 so that motor assemblies 182*a,b* are axially fixed relative to intermediate sleeve 170. This ensures that spindle 178 and brake 180 are accurately positioned relative to rack 172 so that the teeth on spindle 178 and brake 180 mesh with the teeth on rack 172. It should be noted that during assembly of device 10" motor assemblies 182*a,b* must be inserted into intermediate sleeve 170 so that flanges 184 are disposed in groove 173 before the motor assemblies are attached to motor housing 190.

As described above, clutch housing 38" and retention sleeve 30" may move axially relative to each other by virtue of engaging screw threads 30"*a*,178. When clutch housing 38" and retention sleeve 30" are fully screwed together, so that end 168 engages flange 169, extension 199 protrudes out of retention sleeve 30". To prevent retention sleeve 30" from being fully unscrewed from clutch housing 38" locking ring 175 is disposed within groove 196 after the clutch housing 38" and retention sleeve 30" are fully screwed together. Locking ring 175 then engages flat portion 198 at an end of retention sleeve 30" if excessive unscrewing between clutch housing 38" and retention sleeve 30" occurs. The possible axial movement between clutch housing 38" and retention sleeve 30" is therefore limited in a first direction by the engagement between locking ring 175 and flat portion 198 and in a second direction by the engagement between end 168 and flange 169.

Locking ring 175 may be radially elastically expanded or compressed during assembly by virtue of split 175*a*, which allows the circumference (and therefore radius) of ring 175 to increase or reduce slightly when it is radially expanded or compressed. Ring 175 then snaps back into its unloaded state when the radial expansion or compression is removed, for example when ring 175 is located in groove 197.

In normal use device 10" transmits tensile loads between a BHA attached to mandrel 12 (not shown in FIG. 11) and an upper drill string attached to connector 18 via trigger housing 16 (not shown in FIG. 11). If the BHA becomes stuck disconnection may be effected by first withdrawing brake 180 so that it no longer engages rack 172 and then turning spindle 178 to cause intermediate sleeve 170 and retention sleeve 30" to rotate relative to clutch housing 38".

Figure 12:
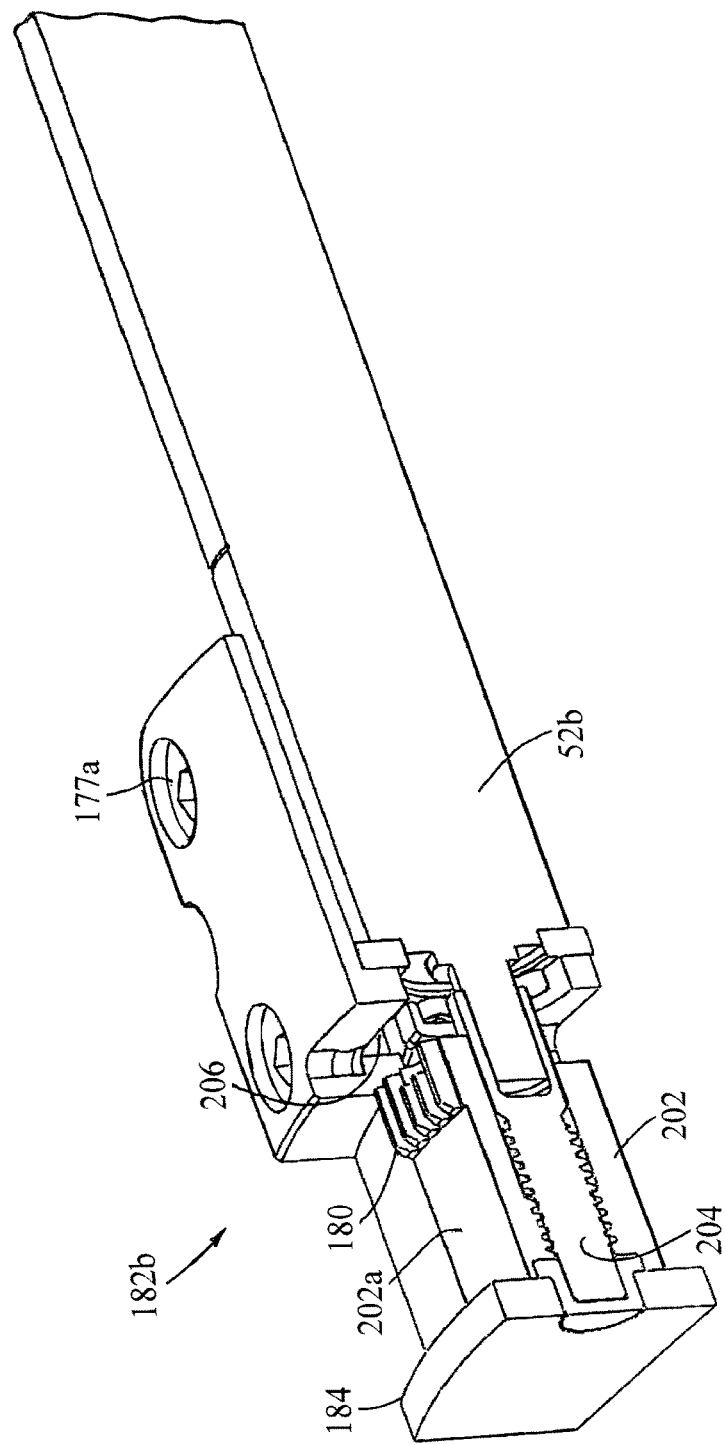
FIG. 12 is a cross-sectional view of a brake according to an aspect of the present invention.

Second motor assembly 182*b*, which includes brake 180, is shown in more detail in FIG. 12. Brake 180 is disposed on internally threaded member 202, which is free to move axially, but cannot rotate, within slot 206 in motor housing 182*b*. Internally threaded member 202 is controlled by motor 52*b* (also referred to as a second motor) via lead screw 204 (internally threaded member 202 and lead screw 204 together also being referred to as a second actuator). To withdraw brake 180 motor 52*b* rotates lead screw 204 by a predetermined amount so that brake 180 moves axially within slot 206 so that flat portion 202*a* and not brake 180 aligns with rack 172 on intermediate sleeve 170. Rotation of intermediate sleeve 170 (and therefore retention sleeve 30") can then be performed by activating the motor 52*a* (also referred to as a first motor) in first motor assembly 182*a*, which controls spindle 178 (also referred to as a pinion) that engages circumferential rack 172 (the spindle 178 and rack 172 together also being referred to as a first actuator).

The motors 52*a,b* in first and second motor assemblies 182*a,b* are each provided with integral high ratio gearboxes, for example planetary gearboxes, so that sufficient torque can be provided to actuate the removal of brake 180 and the disconnection of device 10". In the embodiment illustrated in FIG. 11 the first motor assembly 182*a* comprises two motor assemblies. This may provide a degree of redundancy, as if one of the two first motor assemblies fails then the other may still be able to actuate the disconnection. It may also be necessary to provide sufficient torque, depending upon the torque required to actuate the disconnection and the torque provided by the motors. However, the skilled person will understand that the first motor assembly may comprise more or fewer motor assemblies, depending upon the construction of the device 10", and in some embodiments the first motor assembly comprises a single motor assembly.

Brake 180 prevents vibrations that occur during normal drilling from causing intermediate sleeve 170 to rotate relative to motor housing 190. Because spindle 178 constantly meshes with circumferential rack 172 such rotations would cause motor 52*a* to be driven via its integral high ratio gearbox. This may damage the motor or the gearbox. Inclusion of the brake therefore obviates the need to disengage spindle 178 from rack 172 under normal drilling conditions.

In the embodiment shown in FIGS. 11-12 the operator may provide the signal to activate the disconnection sequence as described above, and the operation of the disconnection sequence may be controlled by the same sensor module 50 described above. Sensors or processors 194*a* (also referred to as controllers) may be disposed within processor module housing 194. Briefly, the device 10" may enter a listening mode if acceleration sensors 195*a* (also referred to as a first sensor) no longer detect the constant acceleration and vibration associated with normal drilling. To commence disconnection, a signal must be sent to the device 10 whilst it is in Listening Mode. In one embodiment of the invention, the signal involves the operator slacking off the upper drill string to put the device under a continuous steady compression. If these conditions are constant for a predetermined time period (e.g. 15 minutes) whilst the device 10 is in Listening Mode, the microprocessors will change the device mode to 'Countdown Mode'. During Countdown mode the operator may send a signal to abort the countdown and reset the device. After a predetermined time period in Countdown Mode the device enters "Disconnect Mode", in which the operator may send the final signal to disconnect the apparatus. Such a final signal may comprise a specified number (eg 3) of consecutive movements, for example tensioning and then slackening of the drill string. Such movements cause a small relative axial movement between clutch housing 38" (which is axially fixed relative to retention sleeve 30") and intermediate sleeve 170. The relative movement between clutch housing 38" and intermediate sleeve 170 may be detected by a motion sensor 195 (also referred to as a second sensor) such as Hall effect magnet assembly. Hall effect magnet assembly may be disposed within notch 198 on clutch housing 198, which notch is located within intermediate sleeve 170 when the device 10" is assembled.

Once the final signal is received the processor is configured to effect disconnection of the device 10" from mandrel 12 (not shown) by first withdrawing brake 180 and then turning spindle 178 to cause relative axial movement between retaining sleeve 30" and clutch housing 38".

Turning to FIGS. 9A to C and 10, a further embodiment of an aspect of the present invention is a circulating subassembly (circsub) 100. While circsubs are used in many applications independently of a disconnect device, they are also frequently used together, with either being above the other in a drill string. Preferably, the circsub 100 is used with a disconnect device according to the present invention with the same control module controlling both the disconnect device and the circsub. However, this is not essential.

Circsub 100 comprises a body 102 with connectors 104, 106 at each end. Within the body is a control sleeve 108 having an extension 110. Within the bores 112, 114 and 116 of the extension, control sleeve and body respectively is axially slidably disposed a control piston 118. The extension 110 and control sleeve 108 are fixed and have narrower bores than the body 112 so that, when mud pressure builds in the bores, there is a net force on the piston towards an open position as shown in FIG. 9B. However, in the absence of mud pressure, a return spring 120, acting between the control piston and control sleeve, can press the piston towards a closed position shown in FIG. 9C. In the former position, ports 122 are exposed to the bore 116 and mud therein can bypass further travel done the bore to a BHA and instead escape back up the annulus surrounding the drill string in the well bore. The benefits of a circsub are well known and need no further explanation here.

A motor 126 is disposed in the control sleeve and has a pinion 128 that drives a sleeve 130 around an axis centred on the longitudinal axis of the tool 100. The sleeve has a circumferential rack (not visible in the drawings) with which the pinion meshes. The sleeve has castellations 132 (not easily visible in the drawings), at least on one side. The piston 118 likewise has castellations 134 (also not easily visible in the drawings), at least on another side. The respective castellations 132,134 are adapted to adopt one of two (or more) different axial orientations with respect to one another depending on the rotary position of one with respect to the other.

In the open position, ridges of the castellations 132 coincide with grooves of the castellations 134 on the other, and vice versa. Therefore the two sets can interdigitate, and, between them, occupy a shorter axial length than when the ridges on one coincide (angularly) with the ridges on the other. When the castellations interdigitate (and when the mud pressure is elevated), the piston 118 occupies the position shown in FIG. 9B. However, when the ridges oppose one another, as they do in FIG. 9C, then regardless of the elevated mud pressure, the piston is prevented from moving to open the ports 122.

Movement of the sleeve 130 by the motor 126 is also under to control of a separately powered control unit (not shown) which conveniently is the same sensor module 50 described above, indeed, employing the same sensor package. However, by employing a different control algorithm, the module 50 can determine which motor 52,126 to operate, depending on whether the drill string is stuck, needing disconnecting, or merely blocked (or opened, requiring injection of LCM).

For example, in one routine, a specific combination of rotation speed of the drill string and pump pressure is maintained for specified periods of time to signal the control module to open the circsub. That is, a first combination of events is detected by the sensors that has the effect of readying the control module to receive a second combination of events that effects a command to open. The first combination may comprise a specified rotation speed detected by the accelerometers while the pumps are operational, such condition being maintained for a period of time followed by a pause in both.

Under normal drilling conditions circumferential rack on sleeve 130 may be engaged by a brake (not shown) controlled by a motor assembly similar to motor assembly 182b, shown in FIG. 12. Such a brake may disengage the rack before sleeve 130 is driven by pinion 128. The brake advantageously prevents rotation of sleeve 130 relative to the rest of the circsub assembly under normal drilling conditions. This prevents pinion 128 from being rotated by vibrations in the drill string. Such rotation of pinion 128 could otherwise damage motor 126.

While the circsub described above is either on or off (open or closed) circ subs are also conceivable that have intermediate positions where the ports are open to differing degrees. This is achieved by having intermediate positions of the interdigitating castellations 132,134 where the degree of axial movement permitted to the piston is variable. In that event further sequences of events can instruct the control module to open the circsub to whichever degree is desired. Finally, although rotation is preferably employed for controlling the circsub during normal operation, a further command sequence should be capable of being invoked in the event that the drill string gets stuck and/or the pumps cannot be operated or fail to generate the required pressure differences. Thus a sequence of compressions can also be employed. Being able to fully open the circsub in the event of the drill string sticking may be useful either to help free the drill string or assist its withdrawal if a disconnect is the only remaining option.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A disconnect tool for incorporation in a drill string between a downhole assembly and a drill pipe to selectively disconnect the downhole assembly from the drill pipe, said disconnect tool comprising:
   a controller electrically powered by a power source separate from surface level;
   a first sensor of the controller to detect a dynamic variable of the tool in the wellbore and produce an output signal dependent thereon;
   a second sensor of the controller to detect a mechanical signal transmitted from an operator at surface level;
   a first motor driven by the power source under the control of the controller when said mechanical signal is received; and
   a first actuator driven by the first motor to actuate the tool; wherein
   the controller being switchable between at least a first state and a second state in response to changes in said dynamic variable, only in said second state the controller being receptive to said mechanical signal from the operator to drive the first motor, characterised in that the downhole tool further comprises a second motor and a second actuator driven by the second motor, said second actuator comprising a mechanical brake having an engaged position and a disengaged position, said mechanical brake being configured to prevent actuation of the tool when in said engaged position, wherein, once the controller receives the mechanical signal from the operator to drive the first motor the controller is configured to sequentially:
   drive the second motor to move said mechanical brake from the engaged position to the disengaged position; and
   drive the first motor to actuate the tool and disconnect the downhole assembly from the drill pipe.

2. The disconnect tool as claimed in claim 1, said disconnect tool comprising:
   a first part for connection to said drill pipe and a second part for connection to said downhole assembly;
   a disengagement apparatus to release connection between said first and second parts; wherein
   said controller is adapted to change the tool from an active state to a disconnect state when said at least one output signal has satisfied at least one criterion indicating that the tool is stuck, and
   said controller is adapted, when in said disconnect state, to actuate said disengagement apparatus to disconnect the tool when a disconnect operator signal is received by said second sensor.

3. The disconnect tool as claimed in claim 2, wherein prior to entering said disconnect state, the tool enters a listening state;
   said tool changing from said listening state to said disconnect state when the tool has been in said listening state after a first period of time and dependent upon receipt or non-receipt of a transfer operator signal by said second sensor in said first period of time.

4. The disconnect tool as claimed in claim 2, wherein said controller actuates said disengagement apparatus to disconnect the tool when said disconnect operator signal is received by said second sensor during a period of time following the controller entering said disconnect state.

5. The disconnect tool as claimed in claim 2, wherein the or each operator signal is a compression of the drill string and said at least one second sensor is a compression sensor.

6. The disconnect tool as claimed in claim 2, wherein said at least one sensor is an accelerometer.

7. The disconnect tool as claimed in claim 1, in which the dynamic variable includes rotational acceleration which, when the rotational acceleration ceases because a bottom hole assembly (BHA) becomes stuck in the wellbore, serves to switch the tool between an active mode and a disconnect mode, in the latter of which, the tool awaits signals from the surface that instruct the tool to disconnect.

8. The disconnect tool as claimed in claim 7, in which the mechanical signals are compressive forces on the drill string detected as compressions by proximity sensors or strain gauges in the tool.

9. A disconnect tool for incorporation in a drill string between a downhole assembly and a drill pipe to selectively disconnect the downhole assembly from the drill pipe when the downhole assembly is stuck in a wellbore, said disconnect tool comprises:
   a disengagement apparatus and first and second parts, the first and second parts each being coupled to the disengagement apparatus such that the first and second parts are releasably connected to one another by the disengagement apparatus, one of said first and second parts being adapted for connection to said drill pipe and the other of said first and second parts being adapted for connection to said downhole tool, wherein
   said disengagement apparatus comprises a first actuator and first and second coupling elements,
   the first coupling element comprising:
      a die retention sleeve, axially movable in the first part from an operational position towards a disconnect position of the disengagement apparatus;
      a clutch housing, disposed within said die retention sleeve, said clutch housing being axially and rotationally fixed in the first part;
      windows in said clutch housing circumferentially spaced around the clutch housing; and radially displaceable capture dies housed in said windows, and the second coupling element comprising:
an interface of said second part adapted to be engaged by said capture dies, wherein, the first actuator moves the retention sleeve between the operational and disconnect positions, so that when the first and second parts are engaged with one another and the retention sleeve is in the operational position, the capture dies bear against both the die retention sleeve and said interface of the second part to lock said first and second coupling elements and parts together, and when the retention sleeve is moved to the disconnect position, the capture dies can move radially to disengage from said interface so that said coupling is unlocked and said parts can separate, wherein said first actuator comprises the sleeve being screw threaded on said first part and having a circumferential rack driven by a pinion of a first motor, whereby screwing of the sleeve on the first part moves the sleeve axially between said operational and disconnect positions, characterised in that said pinion is fixed to an output shaft so that relative axial movement between the pinion and the output shaft is prevented, the disconnect tool further comprising a second motor and a second actuator controlled by said second motor, said second actuator comprising a mechanical brake having an engaged position and a disengaged position, said mechanical brake being configured to prevent screwing of the sleeve when said mechanical brake is in said engaged position.

10. The disconnect tool as claimed in claim 9, wherein said mechanical brake comprises a plurality of teeth configured to engage said circumferential rack, said second motor being configured to move said plurality of teeth axially between said engaged position in which said teeth engage said circumferential rack and said disengaged position in which said teeth do not engage said circumferential rack.

11. The disconnect device of claim 9 wherein said sleeve comprises a first, retaining sleeve and a second, intermediate sleeve, said first sleeve being screw threaded on said first part and said second sleeve having said circumferential rack, wherein said first sleeve is provided with internal or external splines configured to engage corresponding external or internal splines on said second sleeve, whereby rotation of one of said first and second sleeves is transmitted to the other sleeve, and some relative axial motion between said first and second sleeves is permitted.

12. The disconnect device of claim 11 further comprising a motion sensor configured to detect relative axial motion between said first and second sleeves.

13. The disconnect tool as claimed in claim 9, wherein said capture dies comprise a series of grooves and ridges and said interface and said die retention sleeve have surfaces that are each complimentary to said series of grooves and ridges, and preferably wherein the complimentary ridges of the capture dies and die retention sleeve are part-cylindrical lands adapted to seat on each other in said operational position of the disengagement apparatus.

14. The disconnect tool as claimed in claim 9,
wherein said windows comprise abutment elements that abut ledges on said capture dies to restrict inward radial movement thereof; and/or
wherein compressive forces are transferred between said first part to said second part through shoulder elements on said first and second parts; and/or
wherein tensile forces are transferred between said first part to said second part through said disengagement apparatus; and/or
wherein torque forces are transferred between said first part to said second part through a splined connection between said first and second parts.

15. The disconnect tool as claimed in claim 9, wherein said interface has an extension above and below said disengagement apparatus that is sealed to said first part to define a chamber enclosing said disengagement apparatus between said first and second parts, said chamber being filled with oil to lubricate said disengagement apparatus.

16. The disconnect tool as claimed in claim 9, further comprising a controller to control actuation of said disengagement apparatus, the controller comprising:
at least one first sensor that detects at least one dynamic variable and produces at least one output signal based thereon;
at least one second sensor that is adapted to receive signals from an operator at the surface; wherein
said controller is adapted to actuate said disengagement apparatus to disconnect the tool when a predetermined series of output signals are produced and a predetermined series of signals are received from the operator at the surface.

17. The disconnect tool as claimed in claim 16, wherein said second sensor comprises said motion sensor configured to detect relative axial motion between said first and second sleeves and said predetermined series of signals comprises a predetermined series of movements of the drill string that cause a predetermined series of relative movements between said first and second sleeves.

18. The disconnect tool as claimed in claim 16, wherein said first sensor comprises at least one accelerometer for measuring the acceleration of the device.

19. The disconnect tool as claimed in claim 16, wherein said tool has at least one compression sensor for measuring compression of the drill string.

* * * * *